(12) United States Patent
Lan et al.

(10) Patent No.: US 8,477,118 B2
(45) Date of Patent: *Jul. 2, 2013

(54) INPUT APPARATUS AND OPTICAL REFLECTION PANEL MODULE

(75) Inventors: Yung-Sung Lan, Kaohsiung County (TW); Kuen-Chiuan Cheng, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 348 days.

This patent is subject to a terminal disclaimer.

(21) Appl. No.: 12/906,127

(22) Filed: Oct. 17, 2010

(65) Prior Publication Data

US 2011/0032188 A1 Feb. 10, 2011

Related U.S. Application Data

(63) Continuation-in-part of application No. 12/629,875, filed on Dec. 2, 2009.

(30) Foreign Application Priority Data

Aug. 10, 2009 (TW) ............................... 98126809 A
Aug. 9, 2010 (TW) ............................... 99126475 A

(51) Int. Cl.
*G06F 3/042* (2006.01)

(52) U.S. Cl.
USPC ............ 345/175; 345/163; 345/157; 345/166

(58) Field of Classification Search
USPC ................................................. 345/163, 166
See application file for complete search history.

(56) References Cited

U.S. PATENT DOCUMENTS

| | | | |
|---|---|---|---|
| 5,463,387 A | 10/1995 | Kato | |
| 5,779,211 A | 7/1998 | Bird | |
| 6,269,753 B1 | 8/2001 | Roddan | |
| 6,322,033 B1 | 11/2001 | Lee | |
| 6,352,303 B1 | 3/2002 | Hope | |
| 6,504,528 B1 | 1/2003 | Kermani et al. | |
| 6,644,605 B1 | 11/2003 | Tyner | |
| 7,058,432 B2 * | 6/2006 | Nishimoto | 455/575.1 |
| 7,121,214 B1 | 10/2006 | Toltzman et al. | |
| 7,942,745 B2 * | 5/2011 | Ikeda et al. | 463/38 |
| 8,077,147 B2 * | 12/2011 | Krah et al. | 345/163 |
| 2002/0155857 A1 * | 10/2002 | Nishimoto | 455/550 |
| 2004/0012568 A1 | 1/2004 | Velikov et al. | |
| 2004/0150620 A1 | 8/2004 | Tsen | |
| 2007/0146318 A1 * | 6/2007 | Juh et al. | 345/157 |
| 2008/0084394 A1 * | 4/2008 | Kang | 345/166 |
| 2009/0200148 A1 * | 8/2009 | Honmatsu et al. | 200/5 A |
| 2010/0045604 A1 * | 2/2010 | Kim | 345/163 |

* cited by examiner

*Primary Examiner* — Van Chow
(74) *Attorney, Agent, or Firm* — Jianq Chyun IP Office

(57) ABSTRACT

An input apparatus including an optical mouse module and a mouse pad module is provided. The optical mouse module includes a light source and an optical sensor. The light source is adapted to emit a light beam. The optical sensor has a sensible distance. The mouse pad module is disposed on the optical mouse module. The mouse pad module includes a sliding sheet elastically coupled to the optical mouse module. The sliding sheet is adapted to move in a three-dimensional space. The optical sensor and the sliding sheet are arranged in an arrangement direction. An operation method of the input apparatus is also provided.

6 Claims, 22 Drawing Sheets

INPUT APPARATUS AND OPTICAL REFLECTION PANEL MODULE

CROSS-REFERENCE TO RELATED APPLICATION

This is a continuation-in-part application of and claims the priority benefit of patent application Ser. No. 12/629,875, filed on Dec. 2, 2009, which claims the priority benefit of Taiwan patent application serial no. 98126809, filed on Aug. 10, 2009, now pending. This continuation-in-part application also claims the priority benefit of Taiwan patent application serial no. 99126475, filed on Aug. 9, 2010. The entirety of each of the above-mentioned patent applications is hereby incorporated by reference herein and made a part of this specification.

BACKGROUND

1. Technical Field

The disclosure relates to an optical input apparatus and an operation method thereof.

2. Description of Related Art

With development of electronic technology, many electronic products trend to be light, slim, short and small. For example, one of development objectives of a notebook computer is miniaturization to facilitate carrying. However, though the notebook computer is already miniaturized, a mouse used to control a cursor on a screen has to be placed on a plane for usage. If the notebook computer is used at a place other than a desktop (for example, on a laptop), it is generally hard to find a plane for placing the mouse. Therefore, in some of the notebook computers, a touch platform or a track point is configured on a surface adjacent to a keyboard for controlling the cursor. However, the touch platform occupies a surface area of the notebook computer, which may limit the notebook computer to implement features of lightness, slimness, shortness and smallness. Moreover, compared to an operation mode of the mouse, an operation mode of the touch platform and the track point is inconvenient for general users, so that the user cannot accurately and quickly control the cursor.

In addition, when the notebook computer is used for briefing presentation, whenever the cursor is required to be moved, the user has to go back to the desk to move the mouse placed on the desktop, or operate the touch platform or the track point of the notebook computer, so that the briefing is not fluent due to the temporary interruption, and time for the conference is prolonged, which may lead to a low efficiency conference. One kind of a conventional mouse applies a sensing system composed of an accelerometer and a gyroscope to achieve a handheld operation without operating the mouse on a plane. However, the sensing system composed of the accelerometer and the gyroscope is rather expensive, so that such kind of mouse is lack of market competitiveness.

SUMMARY

The disclosure is directed to an input apparatus suitable for a handheld operation.

The disclosure is directed to an operation method of an input apparatus, which can implement a handheld operation.

The disclosure provides an optical reflection panel module, suitable for using an input apparatus. The input apparatus comprises at least a light source and an optical sensor, and the optical sensor has a sensible distance. The light reflection panel module is manufactured in integral form, comprising an optical reflection component, a first stress component, and a second stress component. The optical reflection component is disposed in the input apparatus with a first direction that exceeds the sensible distance, so as to reflect a light of incidence. A side of the first stress component and a side of the second stress component respectively connect to the two sides of the optical reflection panel. The first stress component and the second stress component elastically compress and extend, and so can perform actuation, and the actuation does not interfere with each other. When an external force acts upon the optical reflection component, causing actuation to move the optical reflection component within the sensible distance, the optical reflection component reflects a light beam to the optical sensor. After sensing the actuation of the optical reflection component, a corresponding signal is generated accordingly. When there is no external force, the innate elasticity of the first stress component and the second stress component rebounds the optical reflection component to outside of the sensible distance.

The disclosure provides an input apparatus comprising an optical mouse module and a mouse pad module. The optical mouse module comprises a light source and an optical sensor. The light source is adapted to emit a light beam, and the optical sensor has a sensible distance. The mouse pad module is disposed on the optical mouse module. The mouse pad module comprises a sliding sheet elastically coupled to the optical mouse module. The sliding sheet is adapted to move in a three-dimensional space. The optical sensor and the sliding sheet are arranged along an arrangement direction. When the sliding sheet is pressed to enter within the sensible distance of the optical sensor and moves along a direction perpendicular to the arrangement direction, the sliding sheet reflects the light beam to the optical sensor, so that the optical sensor senses a movement of the sliding sheet relative to the optical mouse module along a direction perpendicular to the arrangement direction. When the sliding sheet is not pressed, an elastic force formed by coupling the sliding sheet to the optical mouse module rebounds the sliding sheet back to outside of the sensible distance, so that the optical sensor is unable to sense a movement of the sliding sheet relative to the optical mouse module along the direction perpendicular to the arrangement direction.

The disclosure provides an operation method of an input apparatus. The input apparatus comprises an optical mouse module and a mouse pad module. The optical mouse module comprises a light source and an optical sensor, wherein the optical sensor has a sensible distance. The mouse pad module is disposed on the optical mouse module. The mouse pad module comprises a sliding sheet elastically coupled to the optical mouse module. The optical sensor and the sliding sheet are arranged along an arrangement direction. The operation method of the input apparatus comprises following steps. First, a first finger presses the sliding sheet to enter within the sensible distance of the optical sensor, and the first finger pushes the sliding sheet along a direction perpendicular to the arrangement direction. Next, the first finger leaves the sliding sheet or a pressing force of the first finger to the sliding sheet is less than an elastic restoring force formed by coupling the sliding sheet to the optical mouse module, so that the sliding sheet is rebounded back to outside of the sensible distance due to the elastic restoring force formed by coupling the sliding sheet to the optical mouse module.

Since in the input apparatus according to the embodiment of the disclosure, the optical mouse module and the mouse pad module are integrated, a handheld operation of the input device can be implemented, so that a usage convenience is improved. In the operation method of the input apparatus according to the embodiment of the disclosure, the finger can push the sliding sheet to move a cursor on the screen, so as to implement the handheld operation.

In order to make the aforementioned and other features of the disclosure comprehensible, several exemplary embodiments accompanied with figures are described in detail below.

BRIEF DESCRIPTION OF THE DRAWINGS

The accompanying drawings are comprised to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

The embodiment of the disclosure provides an input apparatus integrating an optical mouse module and a mouse pad module, and an operation method thereof. Therein, a sliding sheet of the mouse pad module can be pressed by a finger of a user to enter a sensible distance of an optical sensor of the optical mouse module, so that a movement of the sliding sheet can be sensed by the optical sensor. Moreover, when the user's finger leaves the sliding sheet, the sliding sheet is rebounded back to outside of the sensible distance of the optical sensor, so that the optical sensor cannot sense the movement of the sliding sheet, so as to reset the sliding sheet without moving a cursor on a screen. Such operation method is simple, and is easy to be accepted by the user. Moreover, since the optical mouse module and the mouse pad module are elastically coupled, a handheld operation can be implemented without placing the mouse on a plane as that does of a conventional technique, so that a usage convenience thereof is improved. Embodiments are provided below to describe the input apparatus of the disclosure in detail.

Figure 1A:
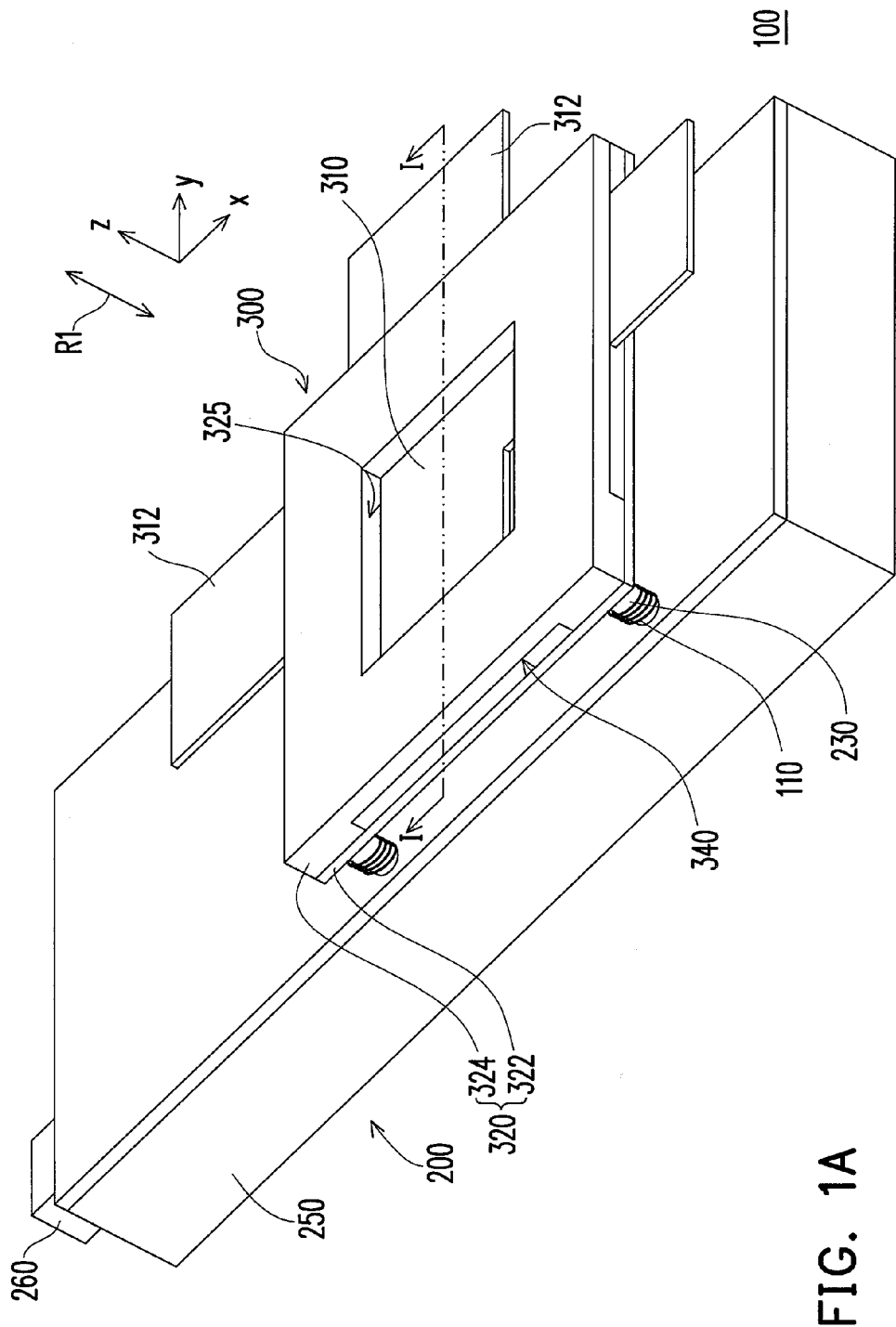
FIG. 1A is a three-dimensional diagram illustrating an input apparatus according to an embodiment of the disclosure.
Figure 1B:
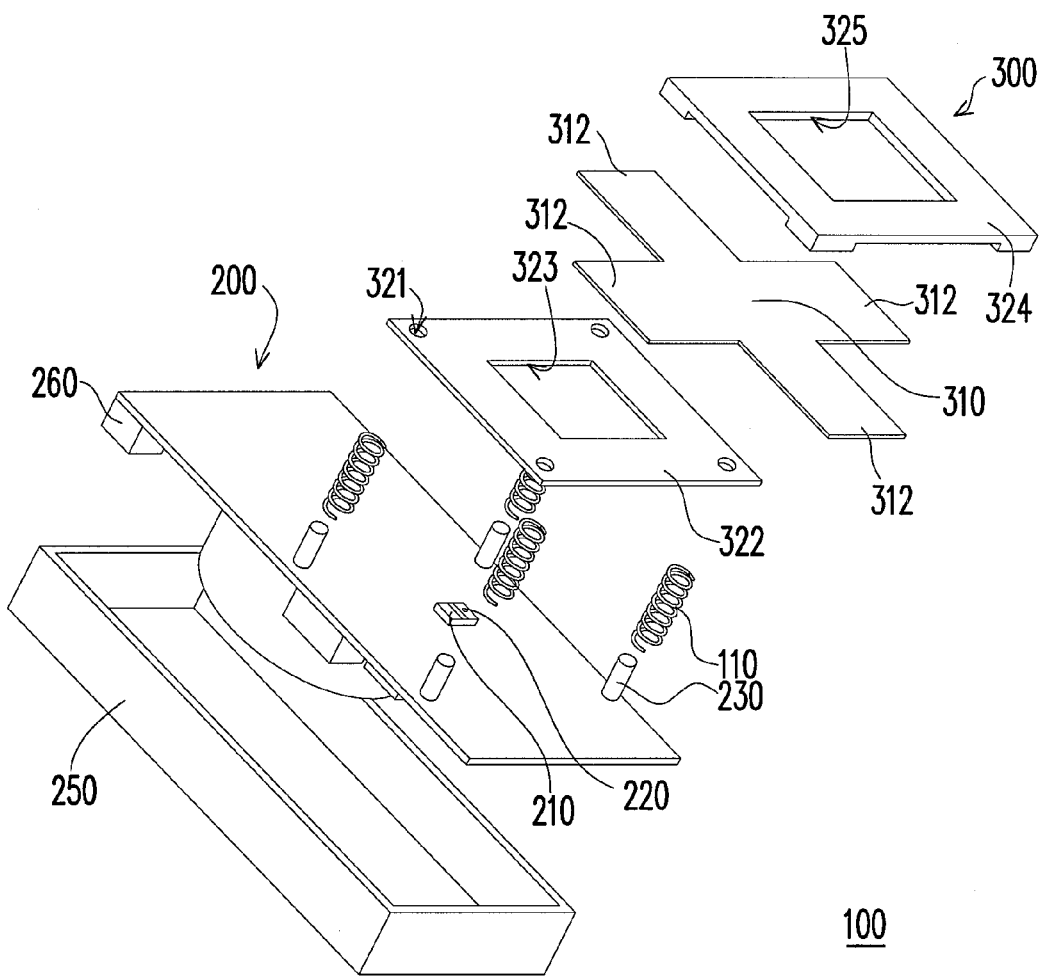
FIG. 1B is an exploded diagram of an input apparatus of FIG. 1A.
Figure 1C:
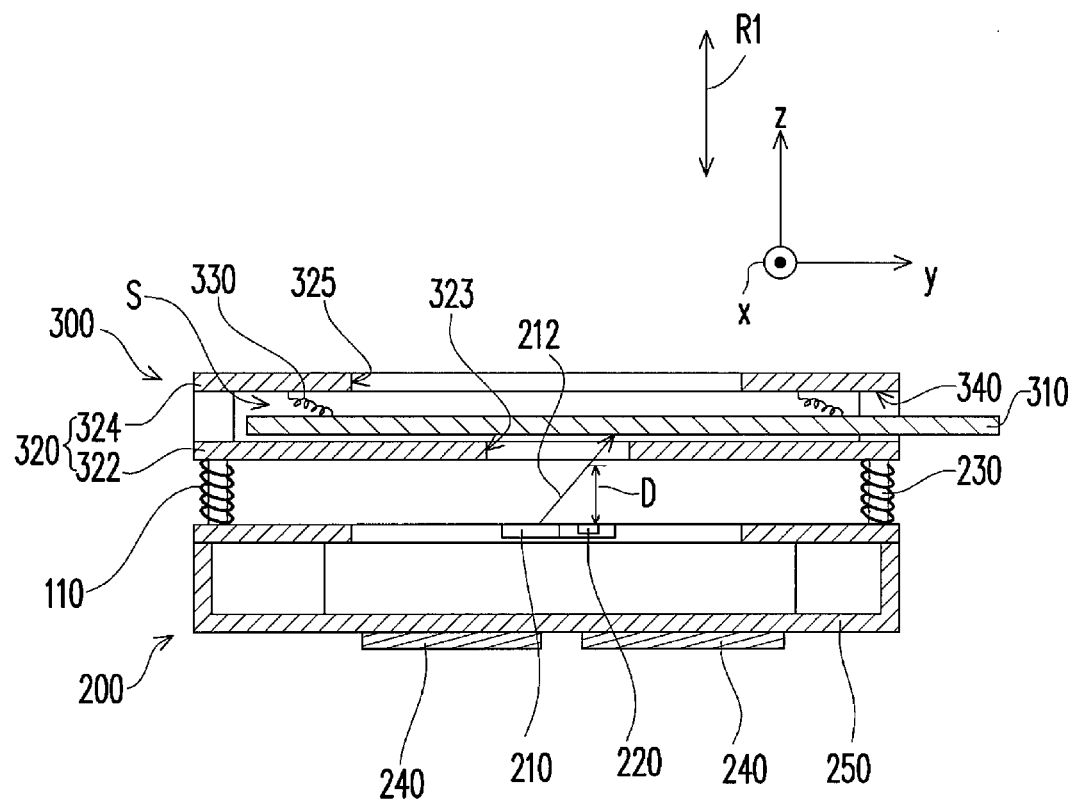
FIG. 1C is cross-sectional view of an input apparatus of FIG. 1A along line I-I.

FIG. 1A is a three-dimensional diagram illustrating an input apparatus according to an embodiment of the disclosure. FIG. 1B is an exploded diagram of the input apparatus of FIG. 1A, and FIG. 1C is cross-sectional view of the input apparatus of FIG. 1A along line I-I. Referring to FIG. 1A, FIG. 1B and FIG. 1C, the input apparatus 100 of the present embodiment comprises an optical mouse module 200 and a mouse pad module 300. The optical mouse module 200 comprises a light source 210 and an optical sensor 220, wherein the light source 210 is adapted to emit a light beam 212, and the optical sensor 220 has a sensible distance D. The mouse pad module 300 is disposed on the optical mouse module 200. The mouse pad module 300 comprises a sliding sheet 310 elastically coupled to the optical mouse module 200, wherein the sliding sheet 310 is adapted to move in a three-dimensional space. In detail, the three-dimensional space where the input apparatus 100 is located can be defined by an x-axis, a y-axis and a z-axis perpendicular to each other (as that shown in FIG. 1A and FIG. 1C). The optical sensor 220 and the sliding sheet 310 are arranged along an arrangement direction R1, i.e. along a z direction.

When the sliding sheet 310 is pressed to enter within the sensible distance D of the optical sensor 220 and moves along a direction perpendicular to the arrangement direction R1, for example, moves along an x direction, a y direction or any direction parallel to a x-y plane, the sliding sheet 310 reflects the light beam 212 to the optical sensor 220, so that the optical sensor 220 senses a movement of the sliding sheet 310 relative to the optical mouse module 200 along a direction perpendicular to the arrangement direction R1. In the present embodiment, the optical sensor 220 is, for example, an image sensor. By comparing images of the sliding sheet 310 that are sensed by the image sensor at different time, a moving direction and a moving distance of the sliding sheet 310 can be determined. When the sliding sheet 310 is not pressed, an elastic force formed by coupling the sliding sheet 310 to the optical mouse module 200 rebounds the sliding sheet 310 back to outside of the sensible distance D, so that the optical sensor 220 cannot sense a movement of the sliding sheet 310 relative to the optical mouse module 200 along the direction perpendicular to the arrangement direction R1.

In the present embodiment, the mouse pad module 300 further comprises a casing 320 elastically coupled to the optical mouse module 200. The casing 320 is adapted to move relatively to the optical mouse module 200 along the arrangement direction R1, i.e. along a +z direction or a −z direction. Moreover, the casing 320 has a containing space S for containing at least a part of the sliding sheet 310. As shown in FIG. 1A and FIG. 1C, a part of the sliding sheet 310 is contained within the containing space S.

In detail, in the present embodiment, the casing 320 comprises a lower cover 322 and an upper cover 324. The lower cover 322 is disposed on the optical mouse module 200, and is adapted to move along the arrangement direction R1, wherein the lower cover 322 has a light pervious opening 323. The upper cover 324 is connected to the lower cover 322, and is elastically coupled to the optical mouse module 200. The sliding sheet 310 is disposed between the lower cover 322 and the upper cover 324, and the light beam 212 is adapted to be transmitted to the sliding sheet 310 through the light pervious opening 323. The upper cover 324 may have an operation opening 325, so that the user's finger can press the sliding sheet 310 through the operation opening 325. Moreover, the user's finger can move in the operation opening 325 to push the sliding sheet 310.

In the present embodiment, the input apparatus 100 further comprises at least one elastic device 110, and in the figures, a plurality of elastic device 110 is taken as an example. The elastic device 110 is coupled to the optical mouse module 200 and the casing 320, and in the present embodiment, the elastic device 110 is coupled to the optical mouse module 200 and the upper cover 324. However, in other embodiments, the elastic device 110 can also be coupled to the optical mouse module 200 and the lower cover 322. In the present embodiment, the elastic device 110 satisfies a condition that when the elastic device 100 reaches a maximum compression amount, a distance between the sliding sheet 310 and the optical sensor 220 just satisfies an optimal sensing condition, i.e. the sliding sheet 310 is located within the sensible distance D of the optical sensor 220. In the present embodiment, the lower cover 322 has at least one positioning hole 321, and in FIG. 1B, a plurality of positioning holes 321 is taken as an example. The optical mouse module 200 has at least one positioning pillar 230, and in FIG. 1B, a plurality of positioning pillars 230 is taken as an example. The positioning pillars 230 are respectively inserted in the positioning holes 321. Each of the elastic devices 110 is, for example, a compression spring surrounding the positioning pillar 230. In the present embodiment, the elastic devices 110 penetrate through the positioning holes 321. However, in other embodiments, the elastic devices 110 can also be elastic sheets or connectors formed by elastic materials, and can be disposed at other positions for coupling the casing 320 and the optical mouse module 200.

When the sliding sheet 310 is pressed, the sliding sheet 310 pushes the casing 320 to move towards the optical mouse module 200, and now the sliding sheet 310 is pressed to enter within the sensible distance D of the optical sensor 220. When the sliding sheet 310 is not pressed, the elastic force of the elastic device 110 rebounds the casing 320 back towards a direction apart from the optical mouse module 200, and now the casing 320 pushes the sliding sheet to outside of the sensible distance D of the optical sensor 220.

In the present embodiment, the mouse pad module 300 further comprises at least one elastic device 330, and in FIG. 1C, a plurality of elastic devices 330 is taken as an example. The elastic device 330 is coupled to the casing 320 and the sliding sheet 310. When the sliding sheet 310 is not pressed, a restoring force of the elastic device 330 is adapted to rebound the sliding sheet 310 back to a specific position relatively to the casing 320 along a direction substantially perpendicular to the arrangement direction R1. In the present embodiment, the elastic device 330 is, for example, a spring. However, in other embodiments, the elastic device 330 can also be a connector formed by elastic material, an elastic sheet or other suitable elastic devices.

In the present embodiment, the casing 320 has at least one side opening 340, and in the figures, four side openings 340 are taken as an example. The side openings 340 are located between the lower cover 322 and the upper cover 324. The sliding sheet 310 may have at least one side protrusion 312, and in the figures, four side protrusions 312 are taken as an example. In other words, the sliding sheet 310, for example, has a cross shape. The side protrusions 312 are adapted to protrude out of the casing 320 through the side openings 340. In the present embodiment, a width of the side opening 340 along a direction perpendicular to the arrangement direction R1 is greater than a width of the protrusion 312 along the direction perpendicular to the arrangement direction R1.

According to the designs that the sliding sheet 310 has the cross shape, and the width of the side opening 340 is greater than the width of the protrusion 312, the sliding sheet 310 can be moved relatively to the casing 320 along a direction substantially perpendicular to the arrangement direction R1 without falling out of the casing 320.

In the present embodiment, the light source 210 and the optical sensor 220 are disposed at a side of the optical mouse module 200 facing to the mouse pad module 300. The optical mouse module 200 further comprises at least one button 240, and in the figures, a plurality of the buttons 240 is taken as an example. The buttons 240 are disposed at a side of the optical mouse module 200 away from the mouse pad module 300. In detail, the buttons 240 are, for example, disposed on a casing 250 of the optical mouse module 200. Moreover, in the present embodiment, the optical mouse module 200 further comprises a signal output module 260 electrically connected to the optical sensor 220. The signal output module 260 is, for example, a wireless signal output module adapted to convert an electrical signal generated in the optical mouse module 200 into a wireless signal, and transmit the wireless signal to a wireless signal receiver (not shown) of a computer (not shown), so as to control a movement of the cursor on the screen.

FIGS. 2A-2E are schematic diagrams illustrating steps of an operation method of an input apparatus according to an embodiment of the disclosure. Referring to FIGS. 2A-2E, the operation method of the disclosure can be applied to the aforementioned input apparatus 100 (shown in FIG. 1A). Before the operation is started, a state of the input apparatus 100 is as that shown in FIG. 2A, and now the sliding sheet 310 is located outside the sensible distance D of the optical sensor 220. The operation method of the input apparatus comprises following steps. First, referring to FIG. 2B, a first finger 50 presses the sliding sheet 310 to enter within the sensible distance D of the optical sensor 220. Now, the light beam 212 emitted from the light source 210 is reflected by the sliding sheet 310, and is transmitted to the optical sensor 220 through the light pervious opening 323. Therefore, the optical sensor 220 can sense a signal of the sliding sheet 310. To be specific, the first finger 50 can press the sliding sheet 310 through the operation opening 325.

Figure 2A:
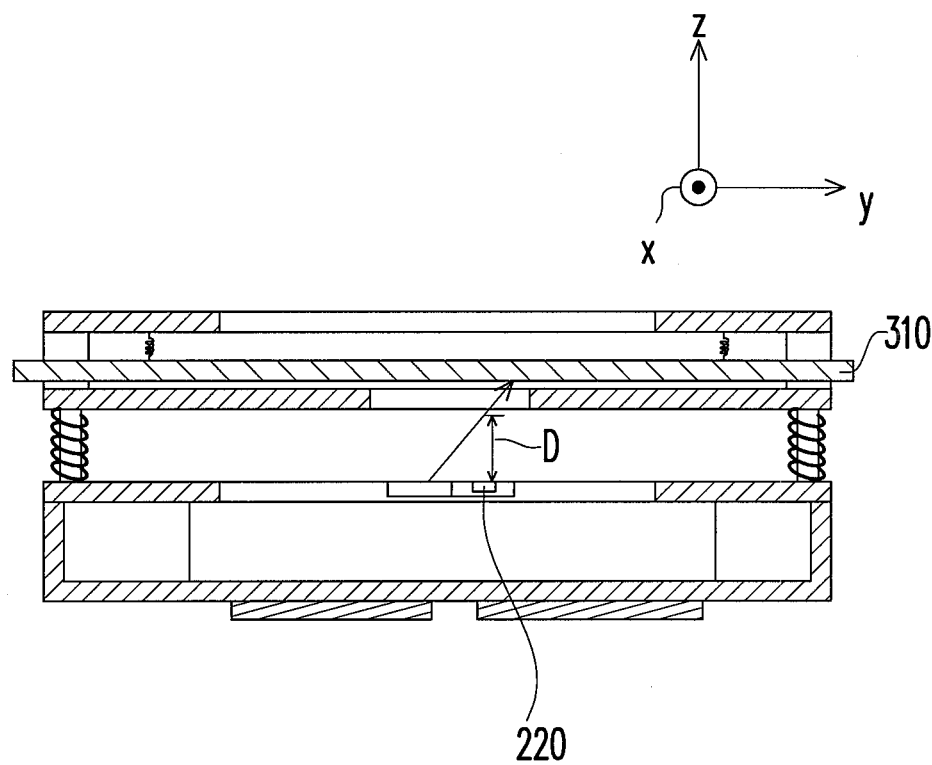
FIGS. 2A-2E are schematic diagrams illustrating steps of an operation method of an input apparatus according to an embodiment of the disclosure.
Figure 2B:
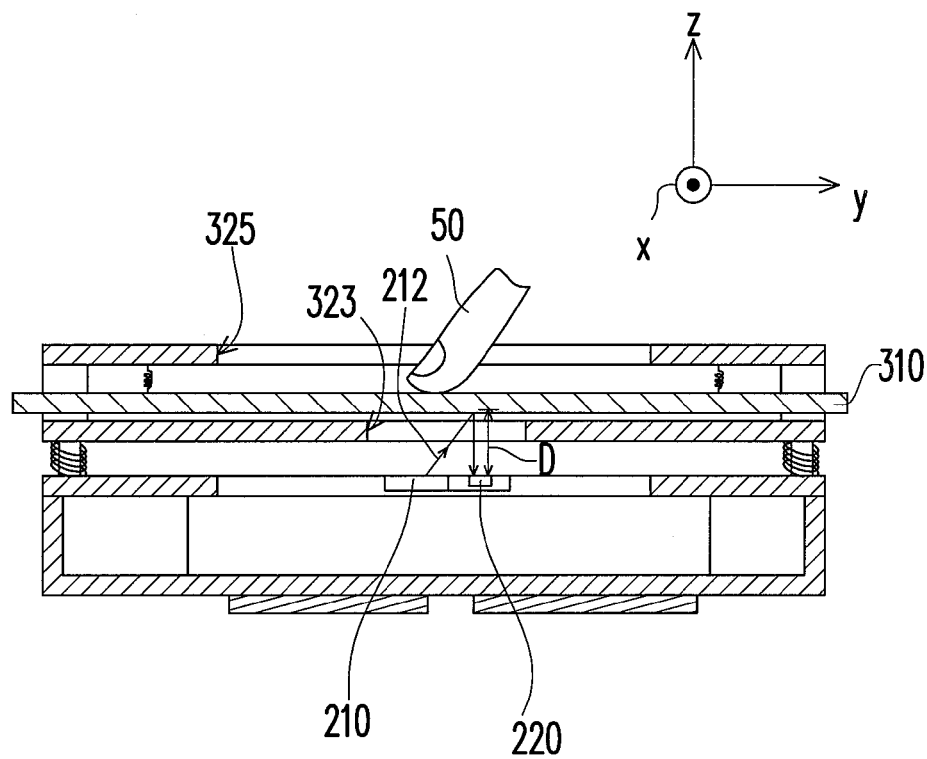
Figure 2C:
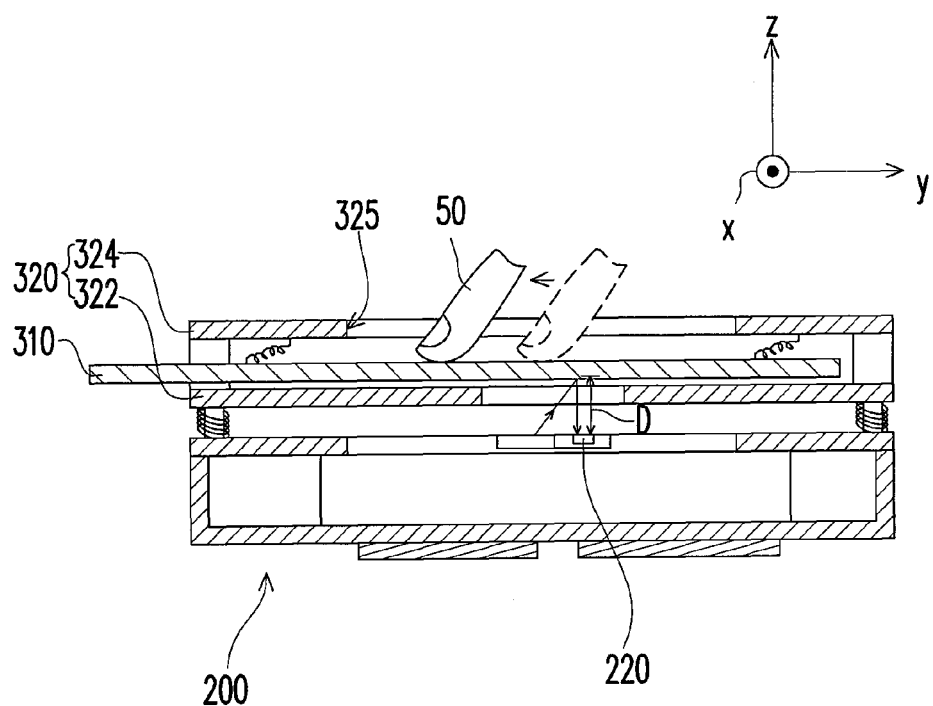

Moreover, referring to FIG. 2C, the user can push the sliding sheet 310 along a direction perpendicular to the arrangement direction R1 through the first finger 50. For example, the first finger 50 can push the sliding sheet 310 along the x direction, the y direction or any direction parallel to the x-y plane. In the present embodiment, the first finger 50 pushes the sliding sheet 310 along a −y direction. Therefore, the optical sensor 220 senses a movement of the sliding sheet 310 relative to the optical mouse module 200 along the direction perpendicular to the arrangement direction R1, and generates an electrical signal. In the present embodiment, the signal output module 260 (shown in FIG. 1A) can convert the electrical signal generated in the optical mouse module 200 into a wireless signal, and transmit the wireless signal to the wireless signal receiver of the computer, so as to control a movement of the cursor on the screen.

Figure 2D:
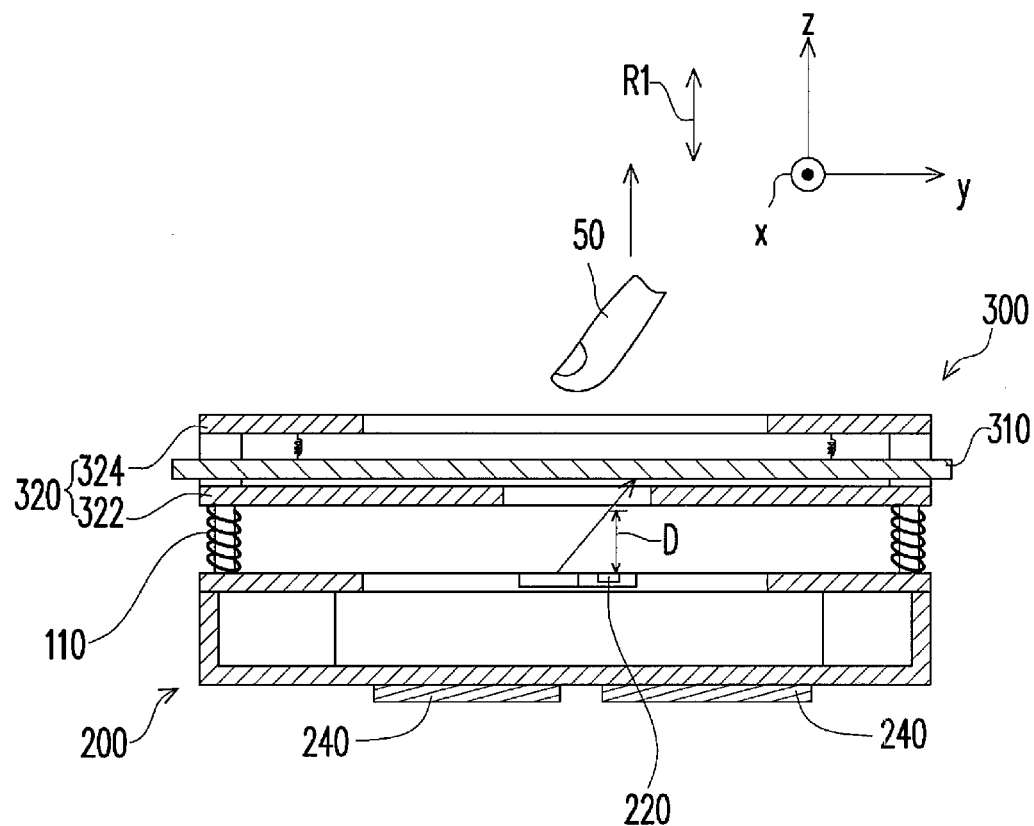
Figure 3:
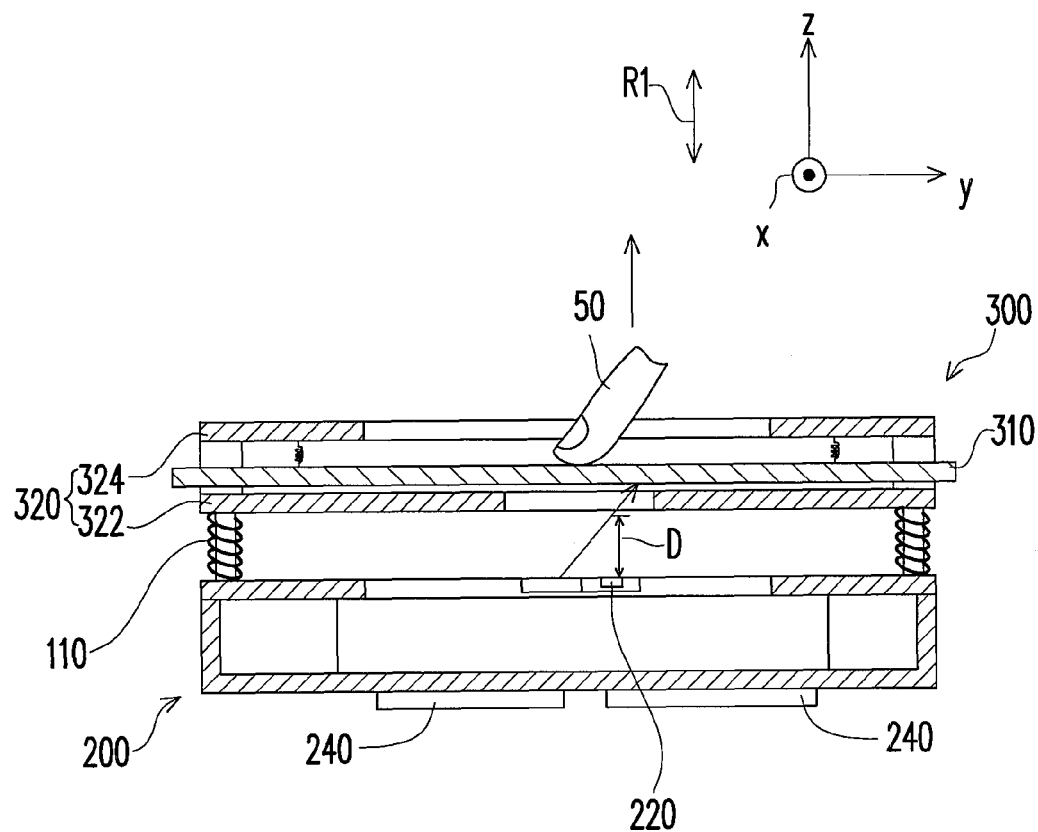
FIG. 3 is a diagram illustrating another variation of FIG. 2D.

Next, referring to FIG. 2D, the first finger 50 leaves the sliding sheet 310 (as that shown in FIG. 2D), or a pressing force of the first finger 50 to the sliding sheet 310 is less than an elastic restoring force formed by coupling the sliding sheet 310 to the optical mouse module 200 (in an embodiment, the pressing force of the first finger 50 is less than the restoring force of the elastic device 110, as that shown in FIG. 3), so that the sliding sheet 310 is rebounded back to outside of the sensible distance D due to the elastic restoring force. In detail, the restoring force of the elastic device 110 rebounds the casing 320 towards a direction apart from the optical mouse module 200, and now the casing 320 pushes the sliding sheet 310 to outside of the sensible distance D. In the present embodiment, when the pressing force of the first finger 50 to the sliding sheet 310 is less than the restoring force of the elastic device 110, or when the first finger 50 leaves the sliding sheet 310, the sliding sheet 310 is adapted to be rebounded back to a specific position relatively to the mouse pad module 300 along a direction perpendicular to the arrangement direction R1. For example, the sliding sheet 310 is rebounded from a position shown in FIG. 2C back to the specific position shown in FIG. 2D, i.e. back to a position that a central area of the sliding sheet 310 is aligned to the optical sensor 220. Therefore, if the first finger 50 pushes the sliding sheet 310 to a position most far away from the aforementioned specific position (i.e. the central position) according to the step shown in FIG. 2C, and the cursor on the screen is still not moved to a predetermined position along a direction corresponding to the moving direction of the sliding sheet 310, the user can leave the first finger 50 from the sliding sheet 310, so that the sliding sheet 310 is rebounded back to the central position. Next, the user can repeat the steps shown in FIG. 2B and FIG. 2C to move the cursor to the predetermined position along the direction corresponding to the moving direction of the sliding sheet 310.

Figure 2E:
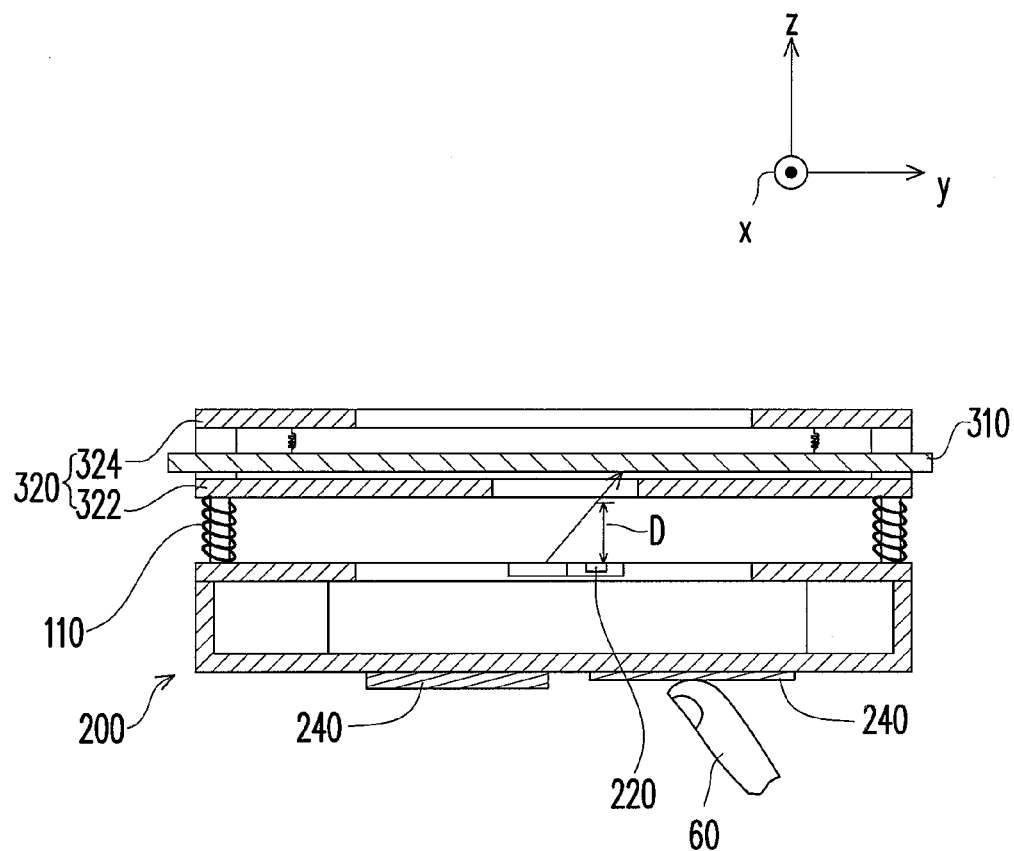

Referring to FIG. 2E, the user can use a second finger 60 to press the button 240. It should be noticed that the operation that the second finger 60 presses the button 240 can also be simultaneously performed in the steps shown in FIG. 2B and FIG. 2C. In the present embodiment, one of the first finger 50 and the second finger 60 is, for example, a thumb of the user, and another one of the first finger 50 and the second finger 60 is, for example, an index finger, a middle finger, a ring finger or a little finger of the user.

Since in the input apparatus 100 of the present embodiment, the optical mouse module 200 and the mouse pad module 300 are integrated, the handheld operation can be implemented. For example, the handheld operation is achieved according to the operation method (the steps shown in FIGS. 2A-2E) of the input apparatus of the present embodiment. The so-called handheld operation refers to that an operation can be performed without placing the input apparatus 100 on a plane, and the user can operate the input apparatus 100 by holding it at any position in the space, so as to improve a usage convenience of the input apparatus 100. Especially when the computer is used for briefing presentation, the user can operate the input apparatus to move the cursor on the screen while leaving the desk. Therefore, since when the cursor is required to be moved, the user can operate the input apparatus 100 at any place without going back to the desk, a degree of fluency and efficiency of the conference can be increased.

Moreover, since the existed conventional optical mouse module 200 and the mouse pad module 300 having a simple structure can be integrated to complete fabricating the input apparatus 100, the input apparatus 100 has a low fabrication cost, so that a market competitiveness thereof is improved. Moreover, a confined space can be formed between the sliding sheet 310 and the optical sensor 220, so that a chance that the sliding sheet 310 and the optical sensor 220 are contaminated by dust can be reduced, so as to improve a reliability of the input apparatus 100.

In addition, in the operation method of the input apparatus of the present embodiment, since actions that the first finger 50 pushes the sliding sheet 310 and leaves the sliding sheet 310 or exerts the pressing force less than the restoring force of the elastic device 110 to rebound the sliding sheet 310 are quite simple, such operation method is easy to be accepted by the user. Moreover, in the operation method of the input apparatus 100 of the present embodiment, the first finger 50 and the second finger 60 are located at two opposite sides of the input apparatus 100 for performing operations, which avails implementing the handheld operation, and improving a holding stability.

Figure 4:
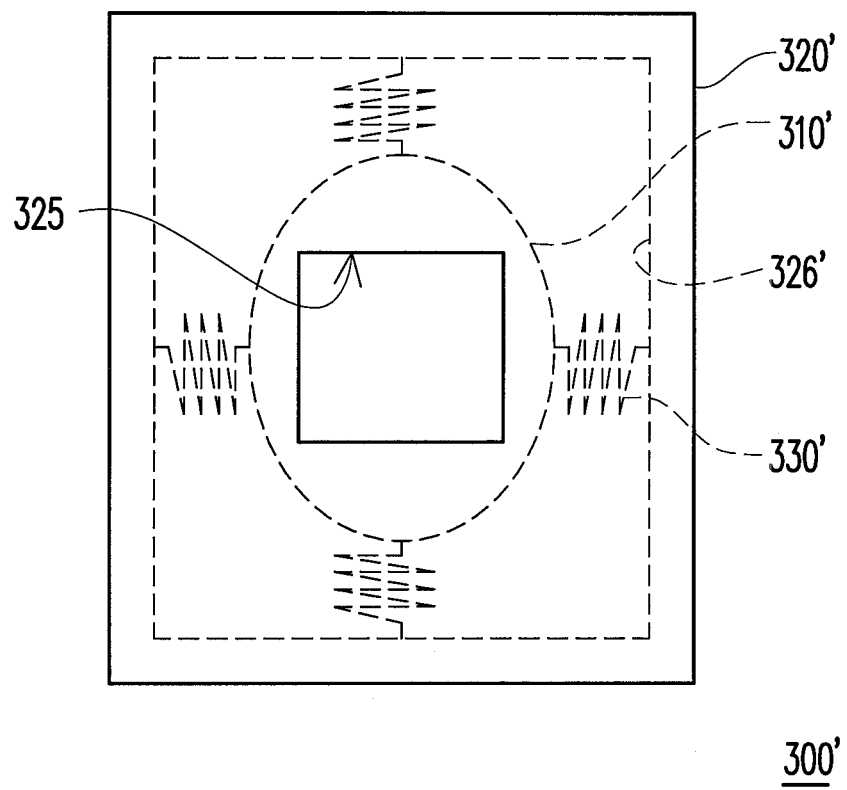
FIG. 4 is a top perspective view of a mouse pad module according to another embodiment of the disclosure.

FIG. 4 is a top perspective view of a mouse pad module according to another embodiment of the disclosure, which is a figure observed along the z direction of FIG. 1A. Referring to FIG. 4, the mouse pad module 300' of the present embodiment is similar to the mouse pad module 300 of FIG. 1A, and differences therebetween are described as follows. In the mouse pad module 300', a casing 320' does not have side openings (for example, the side openings 340 of FIG. 1A), and a sliding sheet 310' does not have side protrusions (for example, the protrusions 312 of FIG. 1A). Moreover, elastic devices 330' connect the sliding sheet 310' and a sidewall 326' of the casing 320', and the elastic devices 330' are, for example, springs.

Figure 5:
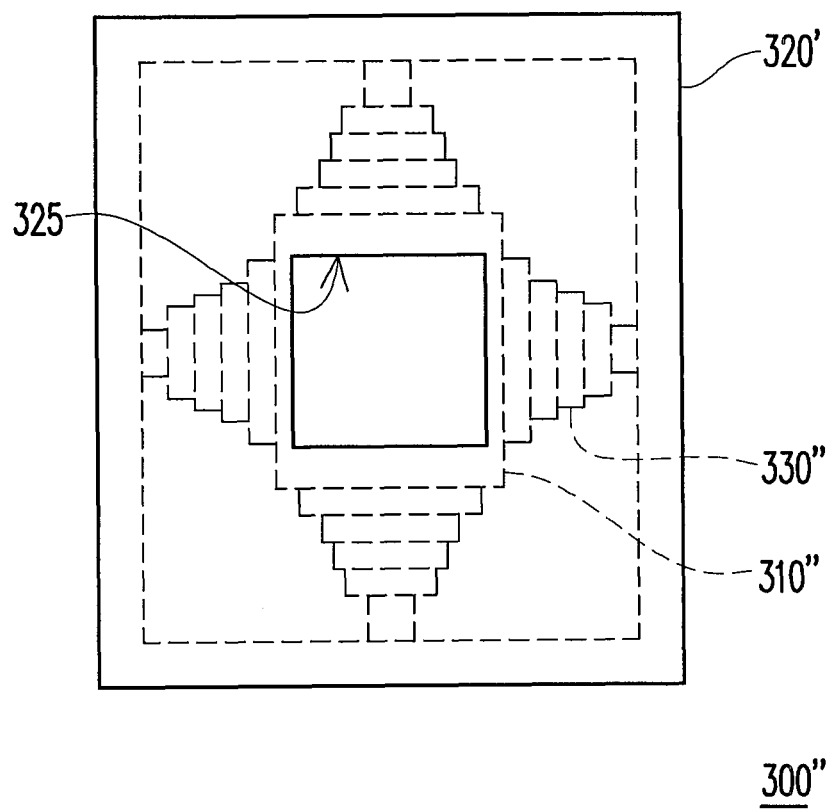
FIG. 5 is a top perspective view of a mouse pad module according to still another embodiment of the disclosure.

FIG. 5 is a top perspective view of a mouse pad module according to still another embodiment of the disclosure, which is a figure observed along the −z direction of FIG. 1A. Referring to FIG. 5, the mouse pad module 300" of the present embodiment is similar to the mouse pad module 300' of FIG. 4, and a main difference therebetween is that in the mouse pad module 300", stretchable parts 330" are used to replace the elastic devices 330' of FIG. 4. The stretchable parts 330" can be stretched or compressed according to positions of a sliding sheet 310".

Figure 6:
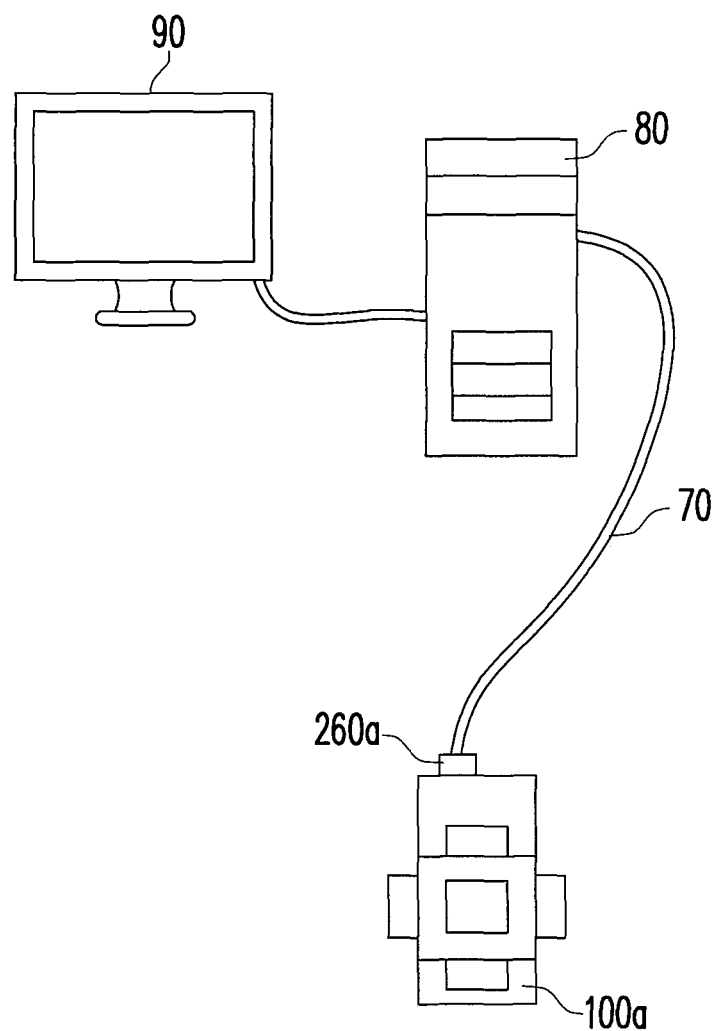
FIG. 6 is a schematic diagram illustrating a computer system applying an input apparatus according to another embodiment of the disclosure.

FIG. 6 is a schematic diagram illustrating a computer system applying an input apparatus according to another embodiment of the disclosure. Referring to FIG. 6, the input apparatus 100a of the present embodiment is similar to the input apparatus 100 (shown in FIG. 1A), and a difference there between is that a signal output module 260a of the input apparatus 100a is a cable signal output module, which is connected to a computer 80 through a signal transmission line 70, so as to control a cursor on a screen 90 connected to the computer 80.

Figure 7:
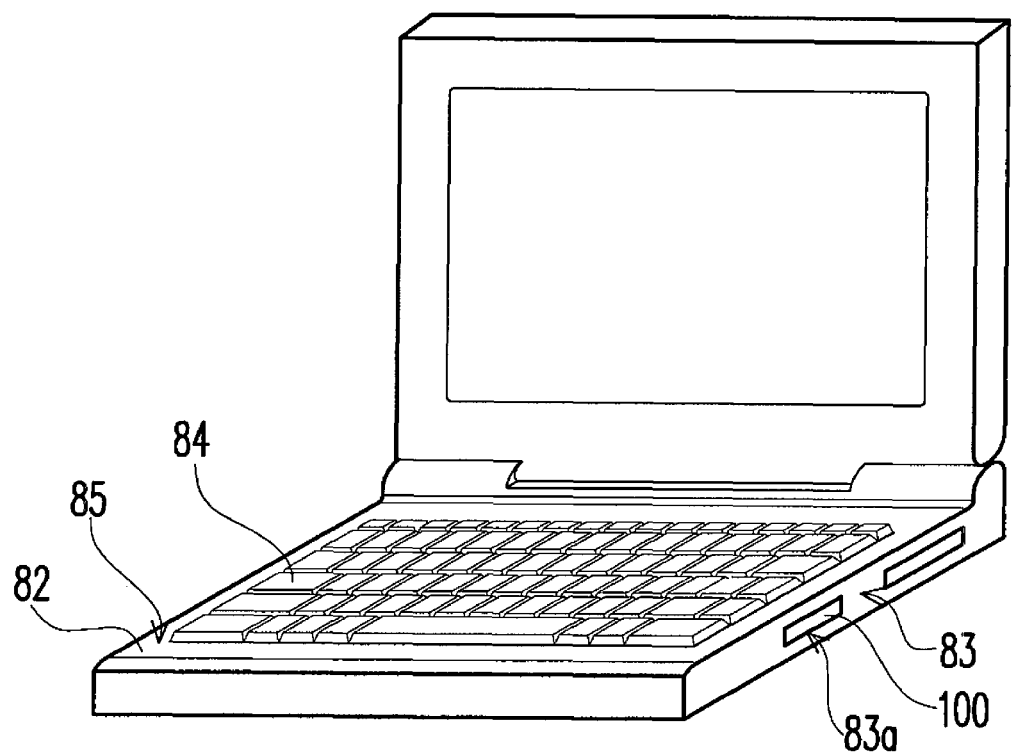
FIG. 7 is a schematic diagram illustrating a notebook computer applying an input apparatus according to another embodiment of the disclosure.

FIG. 7 is a schematic diagram illustrating a notebook computer applying an input apparatus according to another embodiment of the disclosure. Referring to FIG. 7, in the present embodiment, when the input apparatus 100 (shown in FIG. 1A) is not used, it can be disposed in a groove 83a at a side surface 83 of a base 82 of the notebook computer 80a, and when the input apparatus 100 is used, the user can fetch the input apparatus 100 from the groove 83a, and operate it in a handheld approach. Since the input apparatus 100 does not occupy an area of a surface 85 asides a keyboard 84 in the base 82, a size of the base 82 can be further miniaturized, so as to reduce a whole size of the notebook computer. In other embodiments, the input apparatus 100 of FIG. 7 can also be replaced by the input apparatus 100a of FIG. 6.

It should be noticed that the operation method of the input apparatus of other embodiments can also be applied to the input apparatus of other embodiments (for example, the input apparatus 100a of FIG. 6), and the detailed operation steps thereof are similar as that illustrated in FIGS. 2A-2E, and the above embodiment can be referred for detailed descriptions.

In summary, since in the input apparatus according to the embodiments of the disclosure, the optical mouse module and the mouse pad module are integrated, the handheld operation can be achieved, by which the user can operate the input apparatus by holding it at any position in the space, so as to improve a usage convenience of the input apparatus. Especially when the computer is used for briefing presentation, the user can operate the input apparatus to move the cursor on the screen while leaving the desk. Therefore, since when the cursor is required to be moved, the user can operate the input apparatus at any place without going back to the desk, a degree of fluency and efficiency of the conference can be increased.

The mouse pad module of the disclosure, for example, the mouse pad module 300 addressed in FIG. 1A~1C, may be replaced by an optical reflection panel module that moves in three-dimensional space. The optical reflection panel module in the embodiment, through an external force, produces a three-dimensional displacement, and when the external force disappears, the optical reflection panel module quickly returns to its original form. This property is based on the material quality, structural arrangement, or the combination of a plurality of stress components at different angles of the stress component in the optical reflection panel module, to achieve movements going up, down, left, right, forward, or backward. According to the three-dimensional movement in the optical reflection panel module, adjusting the distance of the optical reflection panel and the aforementioned light source and optical sensor, achieves sensing a change in the light beam, generating a corresponding movement signal. Utilizing the different make up and disposition of the stress components in the optical reflection panel module, it can direct to the different angular displacement in the three-dimensional space to generate corresponding stress, in order to return back to original form.

If the optical reflection panel module applies the optical mouse in a previous embodiment, which is the optical mouse module and the mouse pad module integrated together in the input apparatus, besides achieving a handheld operated mouse cursor, it also reduces the thickness of the entire assembly design, and because of component simplicity, it reduces the manufacture cost and fabrication process. In addition, the optical reflection panel module may become single suit module, and adapt to all optical input apparatuses.

Figure 8A:
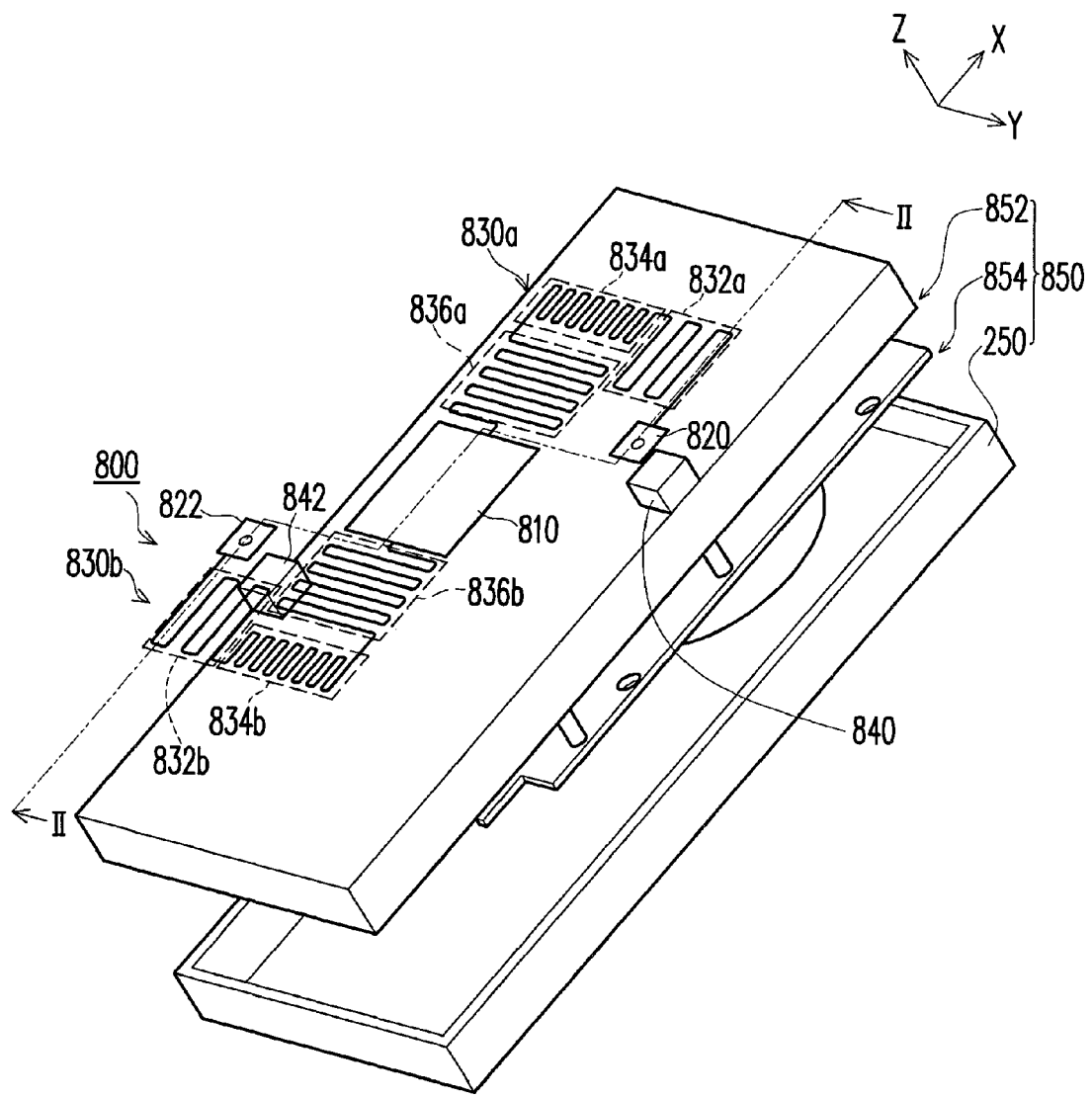
FIG. 8A is an exploded schematic diagram illustrating an input apparatus according to an embodiment of the disclosure.
Figure 8B:
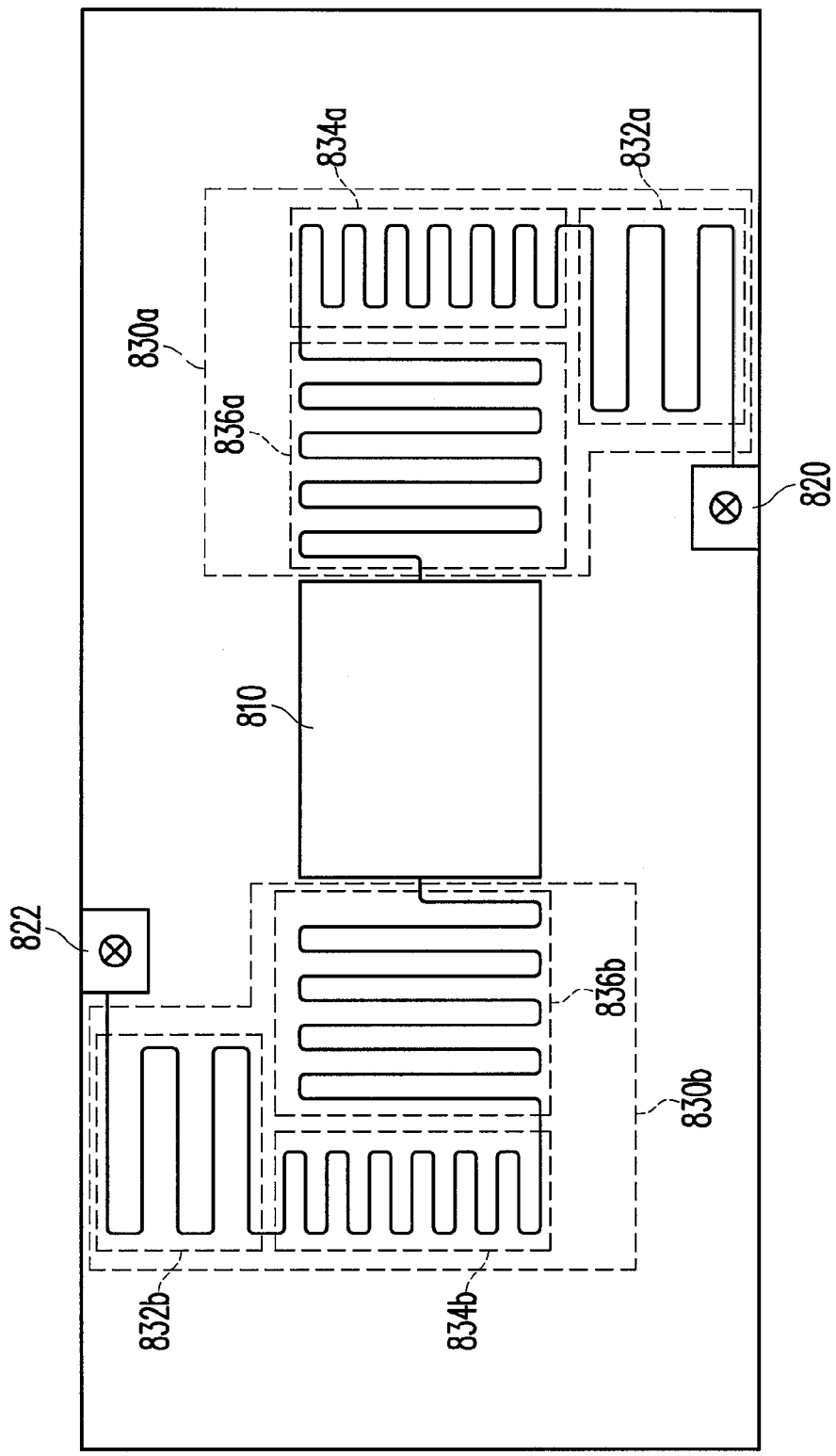
FIG. 8B is a schematic top view of an optical reflection panel module disposed on the input apparatus in FIG. 8A
Figure 8C:
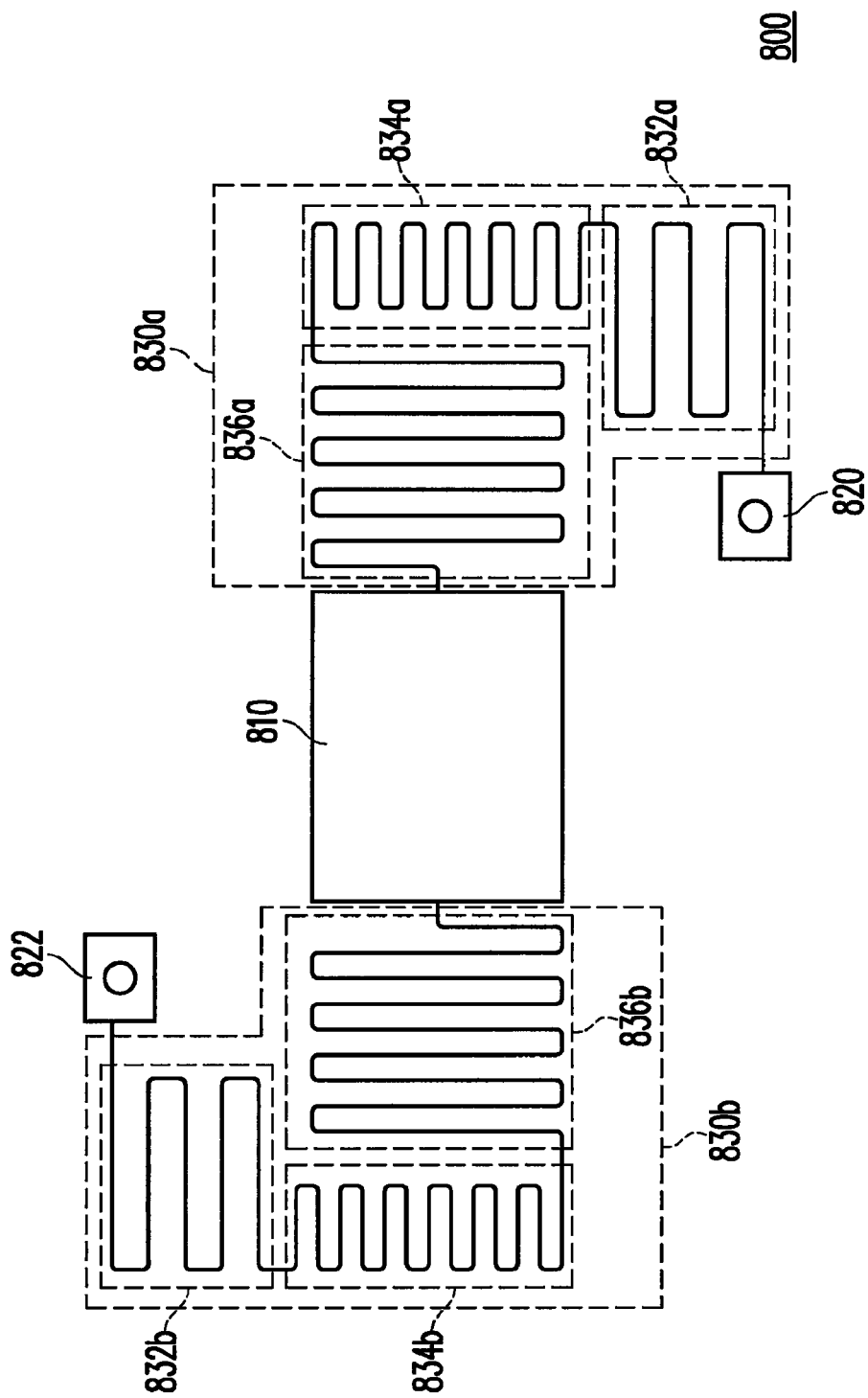
FIG. 8C is a schematic view of an optical reflection panel module according to one embodiment of the disclosure.
Figure 8D:
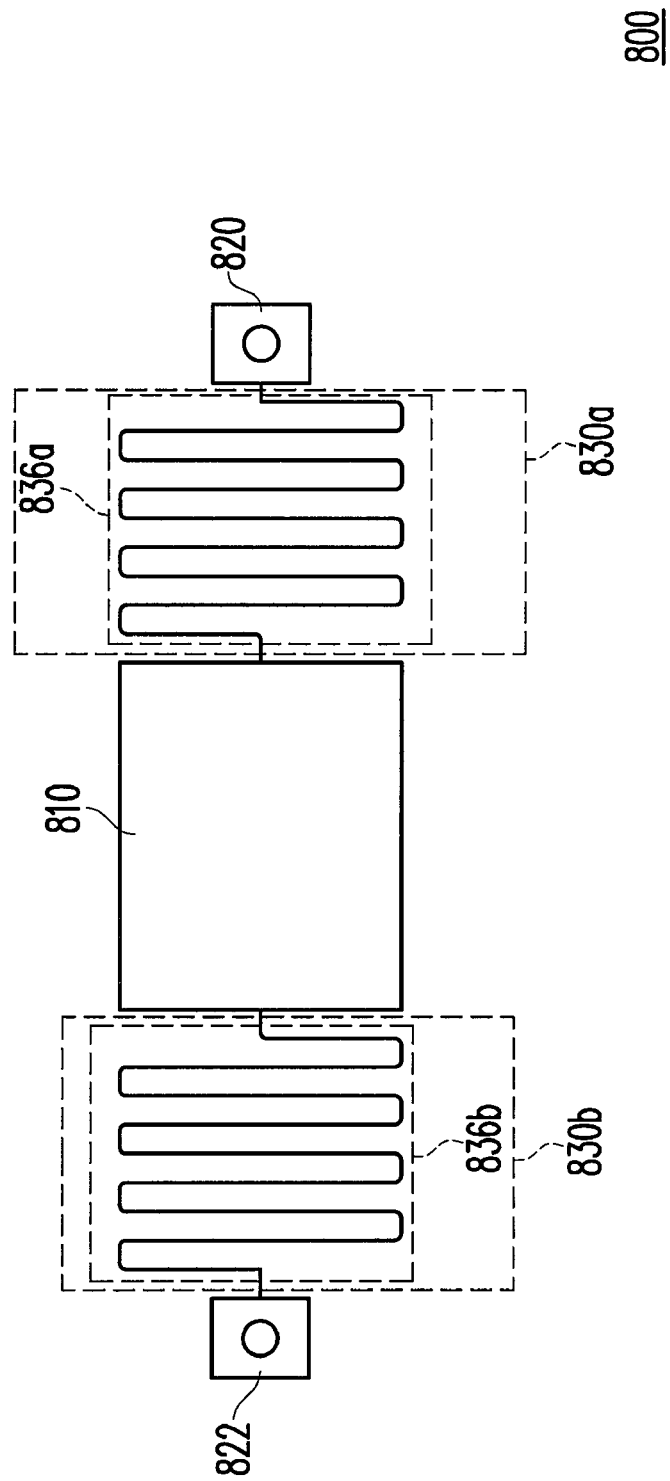
FIG. 8D is a schematic view of an optical reflection panel module according to another embodiment of the disclosure.

The optical reflection panel module, in one of some embodiments, is shown in FIG. 8A~8B. Please refer to FIG. 8A, it is a schematic diagram showing that the optical reflection panel module 800 and the input apparatus 850 are separated from each other. FIG. 8B is a schematic diagram of the optical reflection panel module 800 disposed on the input apparatus 850. The input apparatus 850 at least comprises a substrate 852 and a component 854, and an outer case 250, disposed in the optical reflection panel module 800. A light source and an optical sensor are disposed on the substrate 852. Between the substrate 852 and the optical reflection panel module 800, there is a distance; the distance is greater than the distance which the optical sensor can sense. The light source is suitable to project a focused light beam; however, because the distance between the optical reflection component 810 and the optical sensor is greater than the focused distance that the optical sensor can sense, the optical sensor does not receive the reflected light of the light source reflected from the reflection panel. In other words, before the optical reflection panel module 800 has done any actuation, especially movement towards the substrate 852 to reduce the sensible distance of the optical sensor, the optical sensor does not receive the light beam projected from the light source reflected from the optical reflection component 810. Please refer to FIGS. 8C and 8D. FIGS. 8C and 8D are schematic diagrams that schematically illustrate two embodiments of a plurality of embodiments of the structure of an optical reflection panel module 800.

As shown in FIG. 8C, the optical reflection panel module 800 has two ends that comprise connecting elements 820 and 822, respectively fixed on two spacing pads 840 and 842. The spacing pads 840 and 842, and connecting elements 820 and 822, are in an embodiment, a part of the entire structure of the optical reflection panel module 800, may be disposed upon the input apparatus 850. As a result, the corresponding appearance of the spacing pads 840 and 842 to the input apparatus 850 resemble a suspension method fixed, by a definite distance, above the light source and the optical sensor. Thus, before doing any actuation, especially movement towards the substrate 852, there is a reduction in the sensible distance of the optical sensor in the optical reflection panel module 800. The optical reflection panel module 800 comprises an optical reflection component 810, located above the light source and the optical sensor, and comprises the properties of a light beam generated from a reflected light source.

The optical reflection panel module 800, comprising an optical reflection component 810, is constructed through stress components 830*a* and 830*b* with different stress directions and connecting elements 820 and 822 in a plurality of embodiments. The optical reflection panel module 800 may be designed through integral form, where all components are together considered as one part, or may be fabricated through assembling a plurality of components. If the optical reflection panel module 800 is completed through a preset module, it may comprise space pads 840 and 842 manufactured integrally, where the space pads 840 and 842 are considered as part of the optical reflection panel module 800. It is paired with different input apparatus bodies, for example, a main body in the internal portion of a wireless transmission optical mouse that is portable and able to be minimized. The fastening method between optical reflection panel module 800 and the main body is through either a welding method or an adhering method. Another option is through a detachable fastening method, such as a screw or a latching tenon.

Regarding stress components with different stress directions, the stress components are able to use different material qualities, structural arrangements, or a plurality of stress components, so that the integration at different angles produce stress devices of different angles. In one embodiment, please refer to FIG. 8C. Between the optical reflection component 810 and the connecting element 820, there comprises a first stress component 830*a*. Between the optical reflection component 810 and the connecting element 822, there comprises a second stress component 830*b*.

In one embodiment, the first stress component 830*a* is disposed through an L form, comprising a first stress element 832*a*, and a second stress element 834*a*, and a third stress element 836*a* connected in sequence. The first stress element 832*a*, along the x-axis, resembles the circling method in the layout of a paperclip. The second stress element 834*a*, also has a circling layout along the x-axis. The third stress element 836*a*, though, has a circling layout along the y-axis.

In one embodiment, the second stress component 830*b* is disposed through an L form, and comprises a fourth stress element 832*b*, a fifth stress element 834*b*, and a sixth stress element 836*b*. The circling layout of the above respectively resembles that of the first stress element 832*a*, the second stress element 834*a*, and the third stress element 836*a*.

Movement in the x-axis direction is achieved by utilizing the compression and extension between the third stress element 836*a* and the sixth stress element 836*b*. The different designs of material qualities and routing densities (the different routing amount in a distance) of the third stress element 836*a* and the sixth stress element 836*b*, all produce different stresses in the x-axis direction. Movement in the y-axis direction is achieved by utilizing the compression and extension between the first stress element 832a, the second stress element 834a, the fourth stress element 832b, and the fifth stress element 834b. The different designs of material qualities and routing densities (the different routing amount in a distance) of the first stress element 832a, the second stress element 834a, the fourth stress element 832b, and the fifth stress element 834b, all produce different stresses on the y-axis direction. The design of the stress elements is comparative to a flat surface spring design. The x-axis direction is perpendicular to the y-axis direction, which is arranged in a plane, which is known as x-y plane.

In addition, when considering to avoid the mutual contact effect or interference between the routing when moving up, down, left, right, forward, or backward, the second stress element 834a on the x-axis direction circular width must be designed as smaller than the circular width of the first stress element 832a on the x-axis direction, and the second stress element 834a is then disposed on the outside of the third stress element 836a, so the third stress element 836a and the second stress element 834a on the x-axis are adjacent. Similarly, the fifth stress element 834b on the x-axis direction circular width must be designed as smaller than the circular width of the fourth stress element 832b on the x-axis direction, and the fifth stress element 834b is then disposed on the outside of the sixth stress element 836b, so the sixth stress element 836b and the fifth stress element 834b on the x-axis are adjacent.

The disposition of the first stress component 830a and the second stress component 830b are designed close to a flat surface spring design. When performing actuation, the design allows better compression and extension, but the actuation does not interfere with each other.

The stress design of the first stress component 830a and the second stress component 830b can be adjusted according to need, and is not restricted to three stress elements, nor is it restricted to the L shaped arrangement. The stress component 830a and the stress component 830b just need to be located on the two sides of the optical reflection component 810, and comprise compression and extension characteristics. In addition, it can also perform actuation, where the actuation does not interfere with each other.

The composition of the plurality of stress components shown in FIG. 8C, is just one of some embodiments of the disclosure, but the disclosure is not limited thereto. As long as the two sides of the optical reflection component 810 adopt a symmetrical or an asymmetrical stress element layout design, these designs all belong to the various modifications of the disclosed embodiments. Moreover, as long as a connection between the optical reflection component 810 and the input apparatus 850 is achieved, and also achieve maintaining the distance between the optical reflection component 810 and the optical sensor to exceed the sensible distance when not receiving an external force. According to this type of design, it may use an external force to achieve up, down, left, right, forward, and backward movements, or three-dimensional displacement, and when the external force disappears, it can quickly return to original form.

Please refer to FIG. 8D. FIG. 8D is a schematic showing the optical reflection panel module 800 of another embodiment. FIG. 8D is similar to FIG. 8C, but the difference is in the first stress component 830a between the optical reflection component 810 and the connection element 820, and the second stress component 830b between the optical reflection panel 810 and the connecting element 822. In the embodiment, the first stress component 830a uses a single stress element design, only requiring stress element 836a. The second stress element 830b also uses a single stress element design, only requiring the sixth stress element 836b. The first stress component 830a and the second stress component 830b of the embodiment are designed to be disposed on the two sides of the optical reflection component 810, comprising compression and extension characteristics. In addition, it can also perform actuation, where the actuation does not interfere with each other.

FIGS. 9A-9E are schematic diagrams illustrating an operation method of an input apparatus according to an embodiment of the disclosure. Please refer to FIGS. 9A-9E. The operation method of the embodiment may be used in the input apparatus 900. In the embodiment, for convenience, the main body is described through the optical mouse module 200 in FIG. 2A~2E, though it is not to limit the disclosure.

As drawn, the main body 850 of the input apparatus 900, comprises at least a substrate 852, a component 854, and an outer shell 250 all of which can be disposed on the optical reflection panel module. On the substrate 852 is a light source 210 and an optical sensor 220. The light source 210 and the optical sensor 220 may be disposed on the same or different printed circuit board. Also, a side of the outer shell 250 has a plurality of buttons.

Figure 9A:
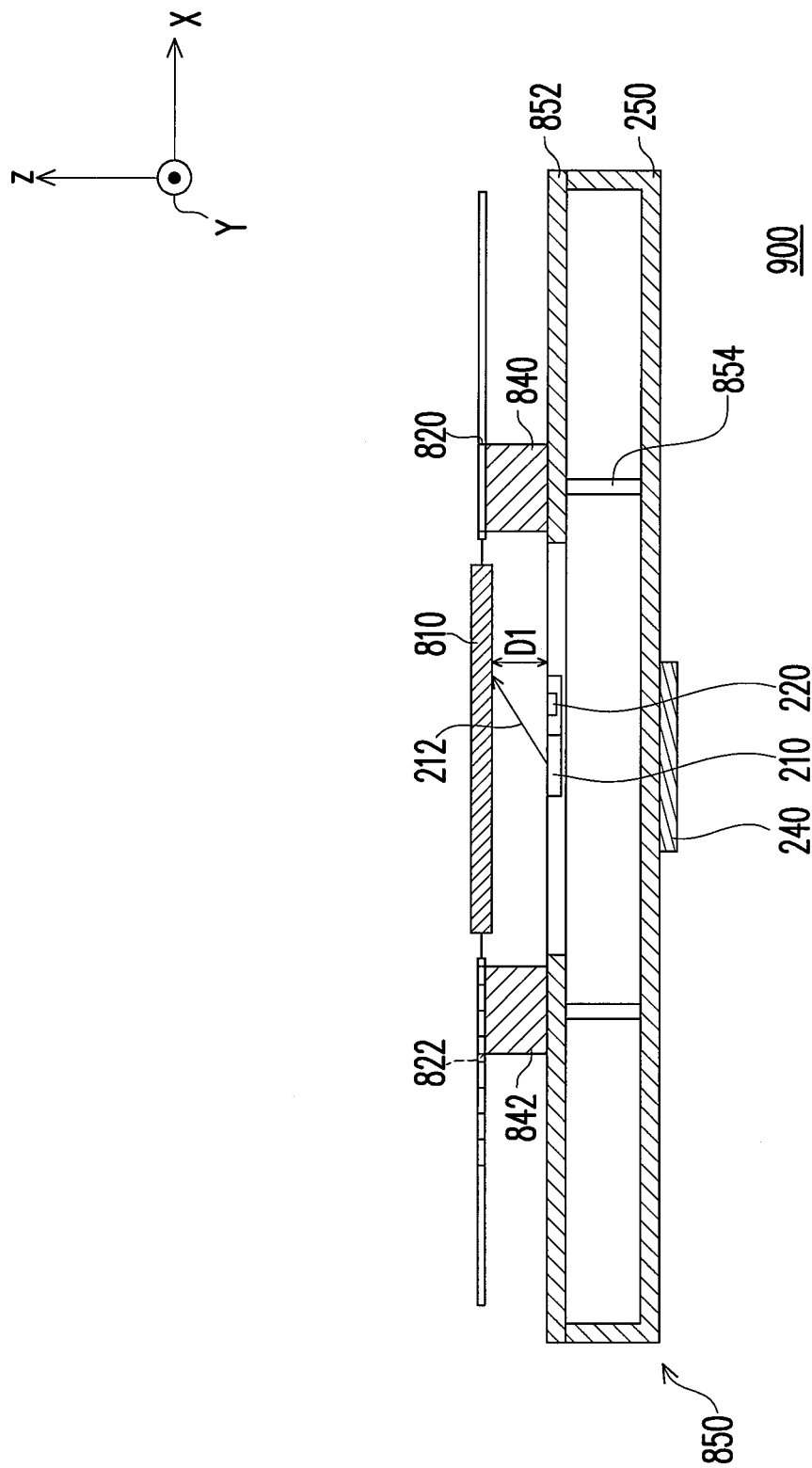
FIGS. 9A-9E are schematic diagrams illustrating steps of an operation method of an input apparatus according to another embodiment of the disclosure.
Figure 9B:
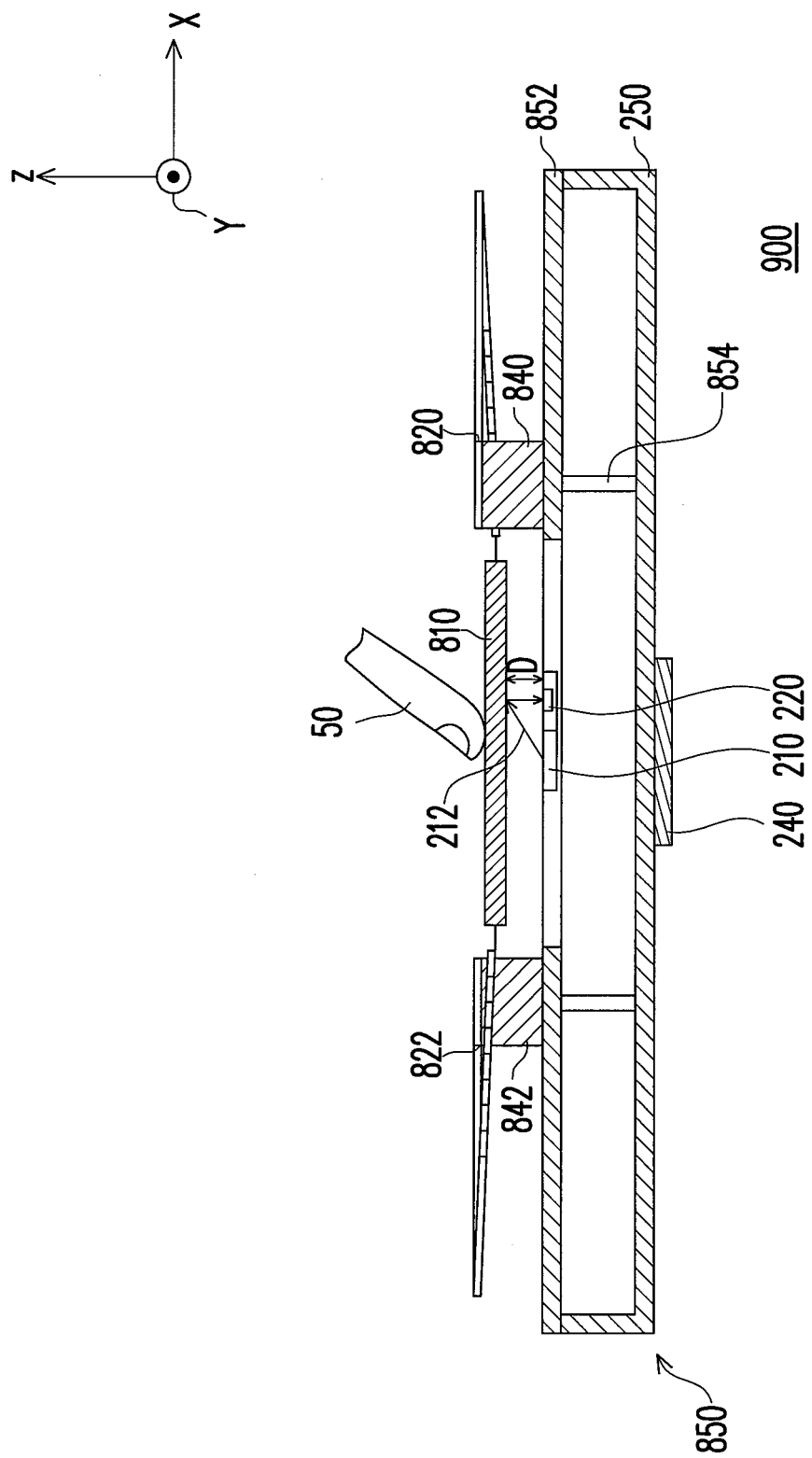

Before operating, the status of input apparatus 900 is shown in FIG. 9A. At this time, the distance D1 between optical reflection component 810 and the optical sensor 220 of the optical reflection panel module 800 exceeds the distance that the optical sensor 220 can sense. First, referring to FIG. 9B, a first finger 50 presses the optical reflection component 810 to enter within the sensible distance D of the optical sensor 220. Now, the light beam 212 emitted from the light source 210 is reflected by the optical reflection component 810, and is transmitted to the optical sensor 220. Therefore, the optical sensor 220 can sense a signal of the optical reflection component 810. To be specific, the first finger 50 can press the optical reflection component 810.

Figure 9C:
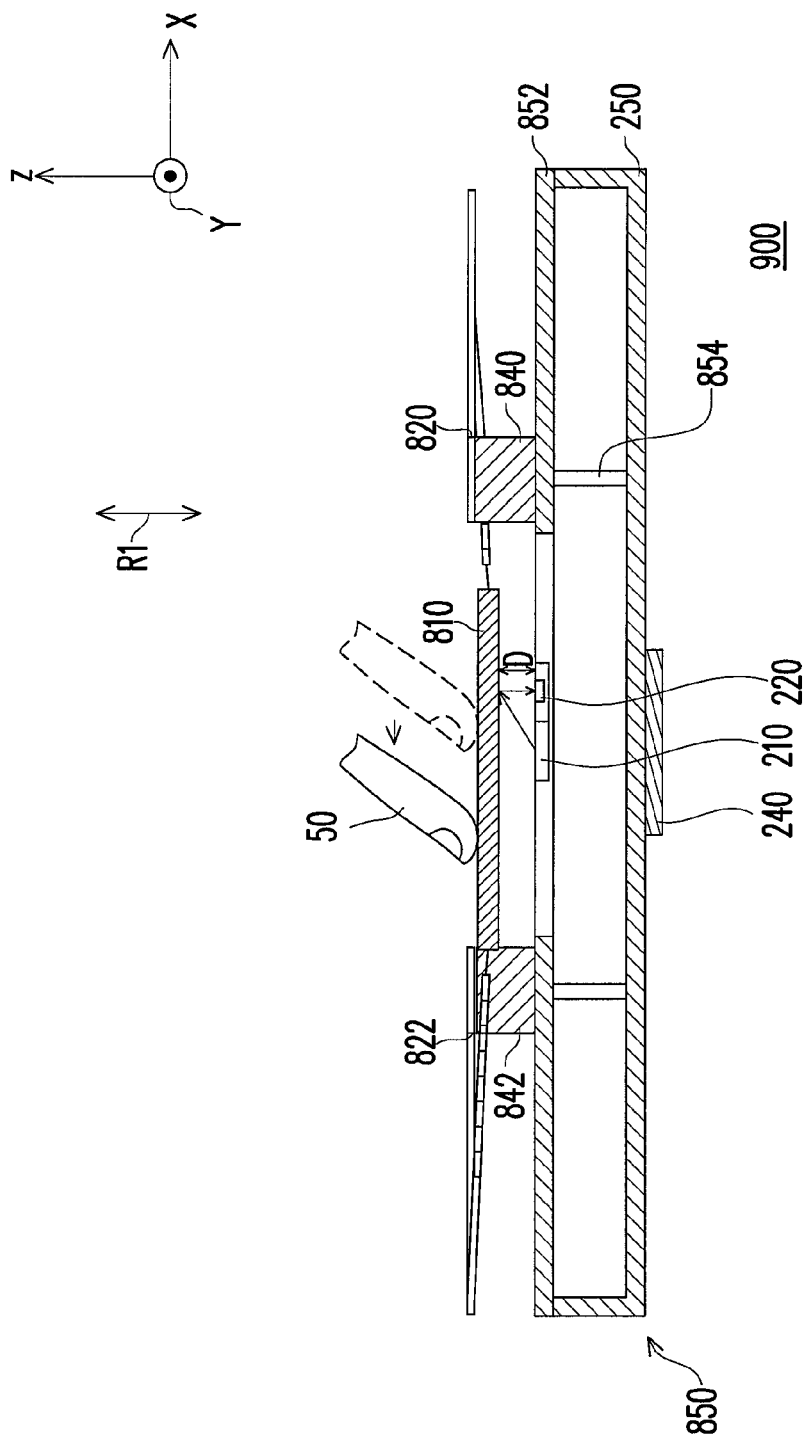

Please refer to FIG. 9C. The user can push the optical reflection component 810 along a direction perpendicular to the arrangement direction R1 through the first finger. For example, the first finger 50 can push the optical reflection component 810 along the x direction, the y direction or any direction parallel to the x-y plane. In the present embodiment, the first finger 50 pushes the optical reflection component along the y direction. Therefore, the optical sensor 220 senses a movement of the optical reflection component 810 relative to the main body 850 along the direction perpendicular to the arrangement direction R1 and generates an electric signal. In the embodiment, the signal output module may convert the electrical signal generated in the optical mouse module 200 into a wireless signal, and transmit the wireless signal to the wireless signal receiver of the computer, so as to control a movement of the cursor on the screen.

Figure 9D:
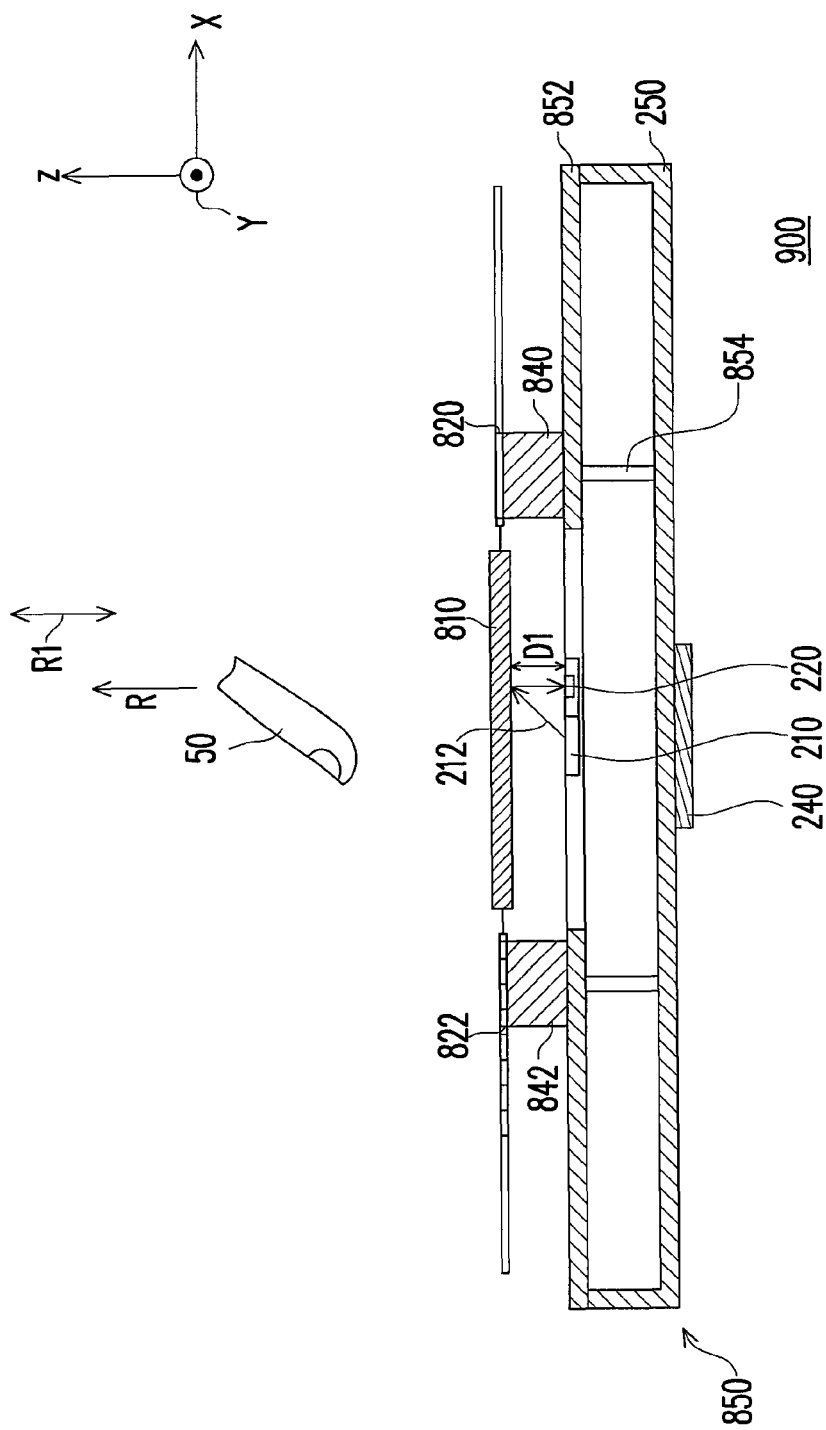

Next, referring to FIG. 9D, the first finger 50 leaves the optical reflection component 810, or a pressing force of the first finger 50 to the optical reflection component 810 is less than an elastic restoring force formed by coupling the optical reflection component 810 to the optical mouse module 200, so that the optical reflection component 810 is rebounded back to outside of the sensible distance D due to the elastic restoring force.

In detail, the stress components of different direction stresses in the optical reflection panel module 800 have a restoring force. The restoring force rebounds the optical reflection panel module 800 away from the direction of the substrate 852. In the embodiment, when the pressing force of the first finger 50 to the optical reflection component 810 is less than the restoring force of the optical reflection panel module 800, or when the first finger 50 leaves the optical reflection component 810, the optical reflection component 810 is adapted to be rebounded back to a specific position relative to the input apparatus 900 along a direction perpendicular to the arrangement direction R1. For example, the optical reflection component 810 is rebounded from a position shown in FIG. 9C back to the specific position shown in FIG. 9D, i.e. back to a position that a central area of the optical reflection component 810 is aligned to the optical sensor 220. Therefore, if the first finger 50 pushes the optical reflection component 810 to a position most far away from the aforementioned specific position (i.e. the central position) according to the step shown in FIG. 9C, and the cursor on the screen is still not moved to a predetermined position along a direction corresponding to the moving direction of the optical reflection component 810, the user can leave the first finger 50 from the optical reflection component 810, so that the optical reflection component 810 is rebounded back to the central position. Next, the user can repeat the steps shown in FIG. 9B and FIG. 9C to move the cursor to the predetermined position along the direction corresponding to the moving direction of the optical reflection component 810.

Figure 9E:
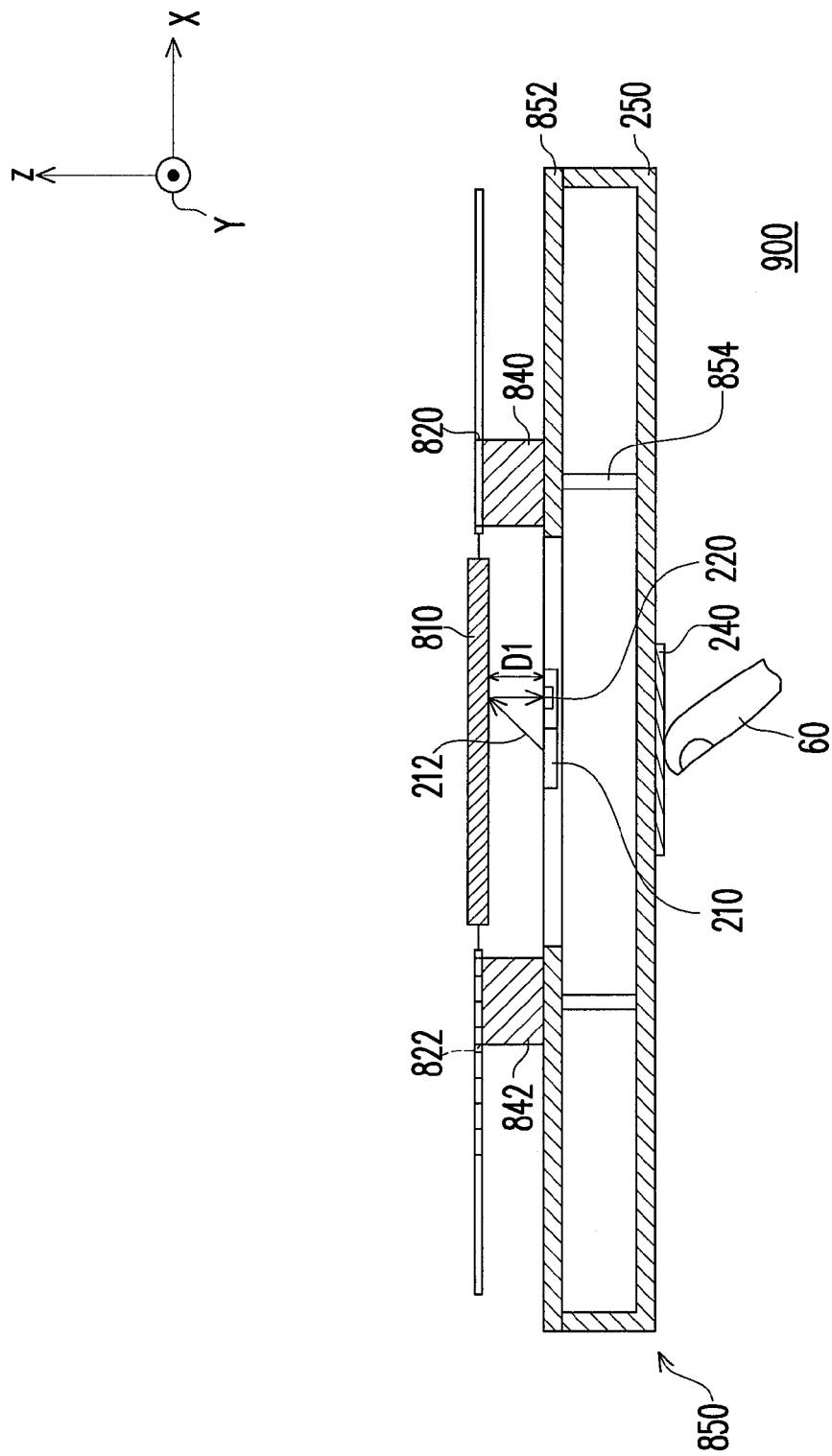

Referring to FIG. 9E, the user can use a second finger 60 to press one of the buttons 240. It should be noticed that the operation that the second finger 60 presses the button 240 can also be simultaneously performed in the steps shown in FIG. 9B and FIG. 9C. In the present embodiment, one of the first finger 50 and the second finger 60 is, for example, a thumb of the user, and another one of the first finger 50 and the second finger 60 is, for example, an index finger, a middle finger, a ring finger or a little finger of the user.

Moreover, since the existed conventional optical mouse module and the mouse pad module having a simple structure can be integrated to complete fabricating the input apparatus according to the embodiments of the disclosure, the input apparatus may have a low fabrication cost, so that a market competitiveness thereof is improved.

Further, in the operation method of the input apparatus according to the embodiments of the disclosure, since actions that the first finger pushes the sliding sheet and leaves the sliding sheet to rebound the sliding sheet are quite simple, such operation method is easy to be accepted by the user. Moreover, in the operation method of the input apparatus according to the embodiments of the present embodiment, the first finger and the second finger are located at two opposite sides of the input apparatus for performing operations, which avails implementing the handheld operation, and improving a holding stability.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An input apparatus, comprising:
   a main body, comprising a light source and an optical sensor disposed therein or thereon, wherein the light source is suitable to emit a light beam, and the optical sensor has a sensible distance; and
   an optical reflection panel module, disposed on the main body, the optical reflection panel module comprising an optical reflection component, a first stress component, and a second stress component, wherein
   a side of the first stress component and a side of the second stress component are connected respectively to the two sides of the optical reflection component, accordingly, the optical reflection component is adapted to move in three-dimensional space, wherein,
   the optical sensor and the optical reflection component are arranged along an arrangement direction, when the optical reflection component is pressed to enter within the sensible distance of the optical sensor and moves along a direction perpendicular to the arrangement direction, the optical reflection component reflects the light beam onto the optical sensor, so that the optical sensor senses a movement of the optical reflection component to the input apparatus along a direction perpendicular to the arrangement direction, when the optical reflection component is not pressed, the stress generated from the first stress component and the second stress component rebounds the optical reflection component back to outside of the sensible distance, so that the optical sensor is unable to sense a movement of the optical reflection component relative to the input apparatus along the direction perpendicular to the arrangement direction.

2. The input apparatus in claim 1, wherein the optical reflection panel module further comprises a first spacing pad and a second spacing pad, respectively connecting to a first connecting element and a second connecting element of the first stress component and the second stress component, wherein the first connecting element and the second connecting element are respectively located on the other side connection of the first stress component not connected to the optical reflection component, and the other side connection of the second stress component not connected to the optical reflection component, wherein, the first spacing pad and the second spacing pad of the optical reflection panel module is disposed on the main body, and the first spacing pad and the second spacing pad is utilized in the optical reflection component so when the optical reflection component is not pressed, the optical sensor distance exceeds the sensible distance.

3. The input apparatus in claim 2, wherein the first spacing pad and the second spacing pad is welded, adhered, or detachedly disposed to the main body.

4. The input apparatus in claim 2, wherein the first stress component comprises a plurality of first stress elements, sequentially connected in between the optical reflection component and the first spacing pad, the second stress component comprises a plurality of second stress elements, sequentially connected in between the optical reflection component and the second spacing pad, when the optical reflection component is pressed, parts of the stress elements deform to different angles, and create a corresponding stress, so when the optical reflection component is not pressed, the optical reflection component rebounds back to outside of the sensible distance, so the optical sensor is unable to sense a relative movement of the optical reflection component along the direction perpendicular to the arrangement direction.

5. The input apparatus in claim 4, wherein the arrangement of the first stress elements and the second stress elements, generate stresses of different directions according to different materials or different routing densities.

6. An optical reflection panel module, adapted to an input apparatus, wherein the input apparatus comprises at least a light source and an optical sensor, and the optical sensor comprises a sensible distance, wherein the optical reflection panel module is manufactured in integral form, comprising:
   an optical reflection component, disposed in the input apparatus with a first direction that exceeds the sensible distance, so as to reflect a light of incidence;
   a first spacing pad and a second spacing pad, maintaining a distance between the optical reflection component and the optical sensor; and a side of a first stress component and a side of a second stress component, respectively connected to the two sides of the optical reflection panel, other side of the first stress component is connected to the first spacing pad, other side of the second stress component is connected to the second spacing pad, wherein the first stress component and the second stress component elastically compress and extend, performing actuation, and the actuation does not interfere with each other, wherein, when an external force acts upon the optical reflection component, causing actuation to move the optical reflection component to within the sensible distance, the optical reflection component reflects a light beam to the optical sensor, after sensing the actuation of the optical reflection component, a corresponding signal is generated accordingly, and when there is no external force, the innate elasticity of the first stress component and the second stress component rebounds the optical reflection component to outside of the sensible distance.

* * * * *